United States Patent
Ji

(10) Patent No.: US 12,468,474 B2
(45) Date of Patent: Nov. 11, 2025

(54) STORAGE DEVICE AND METHOD PERFORMING PROCESSING OPERATION REQUESTED BY HOST

(71) Applicant: SAMSUNG ELECTRONICS CO., LTD., Suwon-si (KR)

(72) Inventor: Soo-Young Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 17/986,010

(22) Filed: Nov. 14, 2022

(65) Prior Publication Data
US 2023/0153023 A1   May 18, 2023

(30) Foreign Application Priority Data

Nov. 15, 2021  (KR) .................... 10-2021-0157092
Mar. 14, 2022  (KR) .................... 10-2022-0031649

(51) Int. Cl.
*G06F 3/06*       (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0608; G06F 3/0638; G06F 3/0641; G06F 3/0659; G06F 3/0671; G06F 9/44594; G06F 9/4843
See application file for complete search history.

(56) References Cited

U.S. PATENT DOCUMENTS

| | | | |
|---|---|---|---|
| 8,561,076 B1 * | 10/2013 | Desai | ............... G06F 3/0611 709/225 |
| 9,256,549 B2 | 2/2016 | Kimmel et al. | |
| 9,652,416 B2 | 5/2017 | Im et al. | |
| 10,089,197 B2 | 10/2018 | Cheng et al. | |
| 10,732,901 B2 | 8/2020 | Matsugami et al. | |
| 10,785,020 B2 | 9/2020 | Balasubramanian et al. | |
| 10,880,124 B2 | 12/2020 | Cheng et al. | |

(Continued)

FOREIGN PATENT DOCUMENTS

KR      10-2237385      4/2021

OTHER PUBLICATIONS

European Search Report Dated Mar. 30, 2023, Cited in Corresponding EP Patent Application No. 22207589.7.

*Primary Examiner* — Nanci N Wong
(74) *Attorney, Agent, or Firm* — Fish & Richardson P.C.

(57) ABSTRACT

A storage device includes; a memory, a management circuit configured to manage an offloading program table and a count table, and a computing circuit configured to perform a processing operation using the offloading program table, the count table, and the memory. The management circuit is further configured to, in response to a first offloading program and a first offloading request, selectively store the first offloading program in the offloading program table in accordance with a determination of whether an offloading program identical to the first offloading program is stored in the offloading program table, and update the count table storing a first count indicating a remaining number of processing operations using the first offloading program.

17 Claims, 21 Drawing Sheets

(56) References Cited

U.S. PATENT DOCUMENTS

| | | | |
|---|---|---|---|
| 11,620,233 B1* | 4/2023 | Habusha | G06F 12/0891 |
| | | | 711/207 |
| 2007/0061804 A1* | 3/2007 | Anzelde | G06Q 10/06 |
| | | | 718/100 |
| 2008/0227552 A1* | 9/2008 | Shimomura | A63F 13/71 |
| | | | 463/43 |
| 2018/0018272 A1* | 1/2018 | Akaike | G06F 3/0659 |
| 2018/0090184 A1* | 3/2018 | Lee | G11C 29/20 |
| 2018/0349054 A1* | 12/2018 | AlAwfi | G06F 3/0641 |
| 2020/0125293 A1* | 4/2020 | Park | G06F 12/0246 |
| 2020/0192757 A1* | 6/2020 | Qin | G06F 11/1076 |
| 2020/0210243 A1 | 7/2020 | Li | |
| 2020/0274952 A1 | 8/2020 | Waskiewicz et al. | |
| 2021/0194829 A1 | 6/2021 | Sun et al. | |
| 2021/0240457 A1 | 8/2021 | Yamato et al. | |
| 2021/0263678 A1 | 8/2021 | Glimcher et al. | |
| 2021/0303050 A1* | 9/2021 | Ching | G06F 1/3203 |
| 2021/0344501 A1* | 11/2021 | Li | H04L 9/3239 |
| 2022/0060427 A1* | 2/2022 | Gallego | G06F 9/546 |
| 2022/0214924 A1* | 7/2022 | Uhlig | G06F 9/4887 |
| 2023/0108145 A1* | 4/2023 | Ma | G06F 11/0709 |
| | | | 718/108 |

* cited by examiner

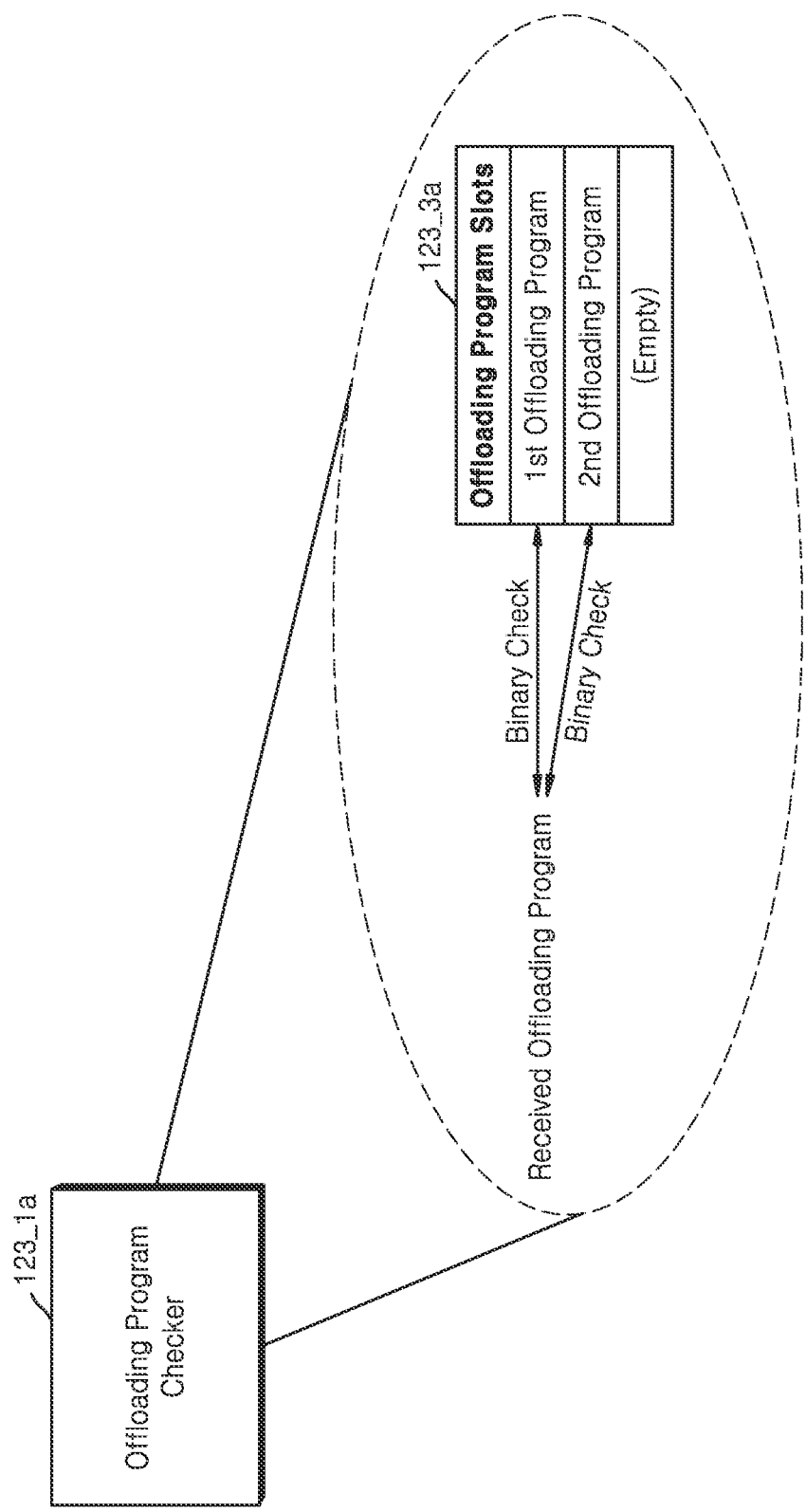

FIG. 11B

| P_TB |
|---|
| Pattern Parmeter |
| Change Interval |
| Max Count |
| Average Count |
| Hot/Cold Offloading Program |

STORAGE DEVICE AND METHOD PERFORMING PROCESSING OPERATION REQUESTED BY HOST

CROSS-REFERENCE TO RELATED APPLICATIONS

This application claims priority under 35 U.S.C. § 119 to Korean Patent Application No. 10-2021-0157092 filed on Nov. 15, 2021, and Korean Patent Application No. 10-2022-0031649 filed on Mar. 14, 2022, the collective subject of which is hereby incorporated by reference in its entirety.

BACKGROUND

The inventive concept relates generally to storage devices. More particularly, the inventive concept relates to storage devices and methods that perform a processing operation using an offloading program in response to a request from a host.

Storage devices are widely used to receive, store and provide data in response to user commands. Storage device may manage data in a stand-alone manner or while communicating with another electronic device.

A host may provide a service to a user by communicating with the storage device. The host may be integrated with the storage device as an electronic system. The host may correspond to a main processor of the electronic system. The host may variously manage data to-be-stored in the storage device and communicate the data to-be-stored to the storage device.

Recently, program offloading techniques have been proposed that seek to overcome limitations associated with host resources and host computational speed. In this regard, a host may communicate processing operations necessary for executing an application to a storage device, and then the storage device may perform the received processing operations and return a corresponding result to the host. For example, the host may provide an offloading program together with an offloading request to the storage device, and then the storage device may perform a processing operation using the offloading program in response to the offloading request.

In addition, in an electronic system (e.g., a data center or a database system) providing services to a number of users, a host may provide the same offloading program to a storage device a number of times in response to requests received from various users. In this case, the storage device stores offloading programs in a memory device whenever offloading programs are provided from the host without considering redundancy. Because the storage device redundantly stores offloading programs identical to one or more offloading programs already stored in the storage device, unnecessary resource consumption and inefficient memory use arise.

SUMMARY

Embodiments of the inventive concept provide storage devices capable of minimizing unnecessary resource consumption and supporting efficient use of memory by preventing redundant storage of offloading programs received from a host. In some embodiments, the inventive concept uses an offloading program table and a count table to effect the prevention of redundant storage of offloading programs received from the host. Further, other embodiments of the inventive concept provide methods of operating the storage device that minimize unnecessary resource consumption and support efficient use of memory by preventing redundant storage of offloading programs received from the host.

According to an aspect of the inventive concept, there is provided a storage device including; a memory, a management circuit configured to manage an offloading program table and a count table, and a computing circuit configured to perform a processing operation using the offloading program table, the count table, and the memory, wherein the management circuit is further configured to, in response to a first offloading program and a first offloading request received from a host, selectively store the first offloading program in the offloading program table in accordance with a determination of whether an offloading program identical to the first offloading program is stored in the offloading program table, and update the count table storing a first count indicating a remaining number of processing operations using the first offloading program.

According to an aspect of the inventive concept, there is provided a storage device including; a memory, and a controller configured to store a first offloading program in an offloading program table, upon determining that the first offloading program is not identical to at least one other offloading program previously stored in an offloading program table, and increasing a first count associated with the first offloading program in a count table, wherein processing operations are executed under the control of the controller in accordance with the offloading program table and the count table, and the count table stores at least one other count respectively associated with the at least one other offloading program.

According to an aspect of the inventive concept, there is provided a method of operating a storage device, wherein the method includes; receiving an offloading program and an offloading request from a host, storing the offloading program in an offloading program table upon determining that the received offloading program is not identical to at least one other offloading program previously stored in the offloading program table, increasing a count associated with the received offloading program in a count table, wherein the count indicates a remaining number of processing operations to be performed using the received offloading program, and performing a processing operation using the received offloading program in response to the offloading program table and the count table.

BRIEF DESCRIPTION OF THE DRAWINGS

Advantages, benefits and features, as well as the making and use of the inventive concept may be more clearly understood upon consideration of the following detailed description together with the accompanying drawings, in which:

FIGS. 4A and 4B are respective conceptual diagrams illustrating operation of offloading program checkers according to embodiments of the inventive concept;

FIG. 11B is a table illustrating parameters related to patterns analyzed by a pattern analyzer of FIG. 11A;

DETAILED DESCRIPTION

Throughout the written description and drawings, like reference numbers and labels are used to denote like or similar elements, components, features and/or method steps.

Figure 1:
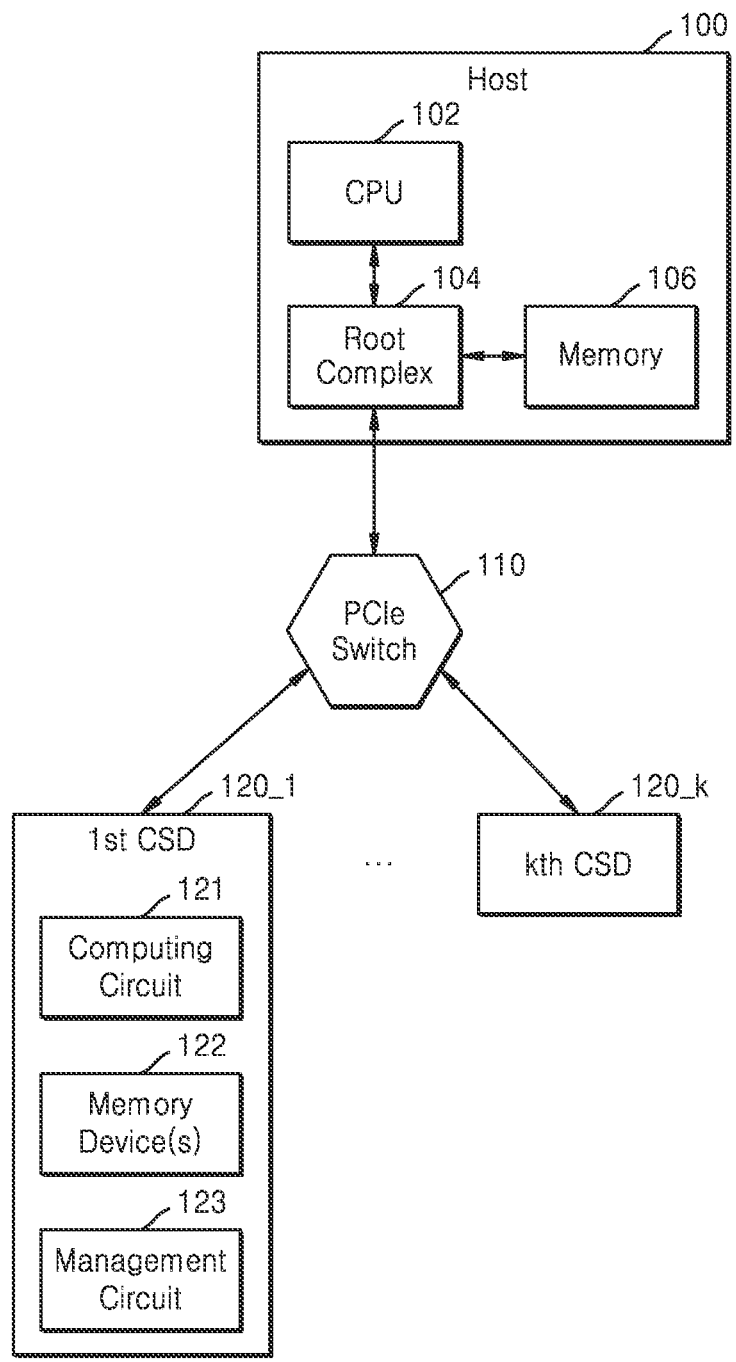
FIG. 1 is a block diagram illustrating an electronic system according to embodiments of the inventive concept.

FIG. 1 is a block diagram illustrating an electronic system 10 according to embodiments of the inventive concept.

Referring to FIG. 1, the electronic system 10 may include a host 100, a Peripheral Component Interconnect Express (PCIe) switch 110, and first to k-th (wherein 'k' is a positive integer) computing storage devices (CSDs) 120_1 to 120_k. The host 100 may include a central processing unit (CPU) 102, a root complex 104, and a memory 106. In some embodiments, the memory 106 may be a system memory and may be coupled with the CPU 102 through the root complex 104. The PCIe switch 110 may be coupled to, or integrated with, the root complex 104. The PCIe switch 110 may be arranged to couple the k computing storage devices (e.g., first to k-th computing storage devices 120_1 to 120_k) to the root complex 104.

In some embodiments, the first computing storage device 120_1 may include a computing circuit 121, a memory device 122, and a management circuit 123. Here, the computing storage device 120_1 to 120_k may be defined as a storage device including logic capable of performing a processing operation in response to an offloading request received from the host 100, and may hereafter be referred to as a storage device or a computational storage drive.

The computing circuit 121 and the management circuit 123 of the first computing storage device 120_1 may be separately implemented or commonly integrated as hardware. Alternately, at least one of the computing circuit 121 and the management circuit 123 may be implemented, wholly or in part, as software and executed by a processor or CPU associated with the first computing storage device 120_1. Although the illustrated example of FIG. 1 assumes that that the computing circuit 121 and the management circuit 123 are separate components, in order to more clearly illustrate various related operations, and the inventive concept is not limited thereto.

In some embodiments, the memory device 122 may be used to store an offloading program received from the host 100 and provide to the computing circuit 121 such memory space as is needed for a processing operation using the offloading program. For example, the memory device 122 may be used to store an offloading program table and a count table, as will be described hereafter in some additional detail. The memory device 122 may be variously implemented to include a volatile memory device (e.g., a static random access memory (RAM) (SRAM), a dynamic RAM (DRAM)), and/or a synchronous RAM (SDRAM)) and/or a non-volatile memory device (e.g., a phase-change RAM (PRAM), a magneto-resistive RAM (MRAM), a resistive RAM (ReRAM), a ferro-electric RAM (FRAM), and/or a flash memory). In some embodiments, the memory device 122 may be a flash memory device, the first computing storage device 120_1 may correspond to a solid state drive (SSD), wherein various operations of the computing circuit 121 and the management circuit 123 are performed using a controller associated with the SSD.

In some embodiments, the management circuit 123 may be used to manage an offloading program table and a count table. Here, the term "offloading program table" is used to denote a data structure or file defining a plurality of slots into which offloading programs may be stored, and the term "count table" is used to denote another data structure or file in which one or more count(s) respectively indicating remaining number(s) of processing operation(s) using different offloading programs may be stored.

In some embodiments, the host 100 may include a plurality of containers (or virtual machines) respectively corresponding to a plurality of users accessing the electronic system 10. Each container may communicate an offloading request and an offloading program to the first computing storage device 120_1, and as a result, the first computing storage device 120_1 may receive a plurality of offloading programs and a plurality of offloading requests from the host 100.

There may be a number of same offloading programs among the offloading programs received from the host 100, the management circuit 123 may use a count table to prevent multiple copies of the same offloading program from being redundantly stored in an offloading program table. The management circuit 123 may also be used to manage the count table in order to perform all processing operations requested by the host 100 without omission.

Accordingly, the computing circuit 121 may perform processing operation(s) using the offloading program table, count table, and memory device 122. For example, the computing circuit 121 may read a first offloading program from the offloading program table, check a count corresponding to the first offloading program in the count table, and execute processing operation(s) using the first offloading program as many times as the number of times matching the count. In this regard, the computing circuit 121 may store data that needs to be stored for processing operations in the memory device 122.

Those skilled in the art will appreciate that the foregoing description of the first computing storage device 120_1 may be analogously applied to one or more of the second to k-th computing storage devices 120_2 to 120_k.

The first to k-th computing storage devices 120_1 to 120_k may be used to manage offloading programs received from the host 100 while preventing redundant storing of the same offloading program using the offloading program table in order to minimize the consumption of time and resources under conditions that might conventionally result in the redundant storing of the same offloading program, thereby improving efficiency of memory usage during the storing of offloading programs.

Figure 2:
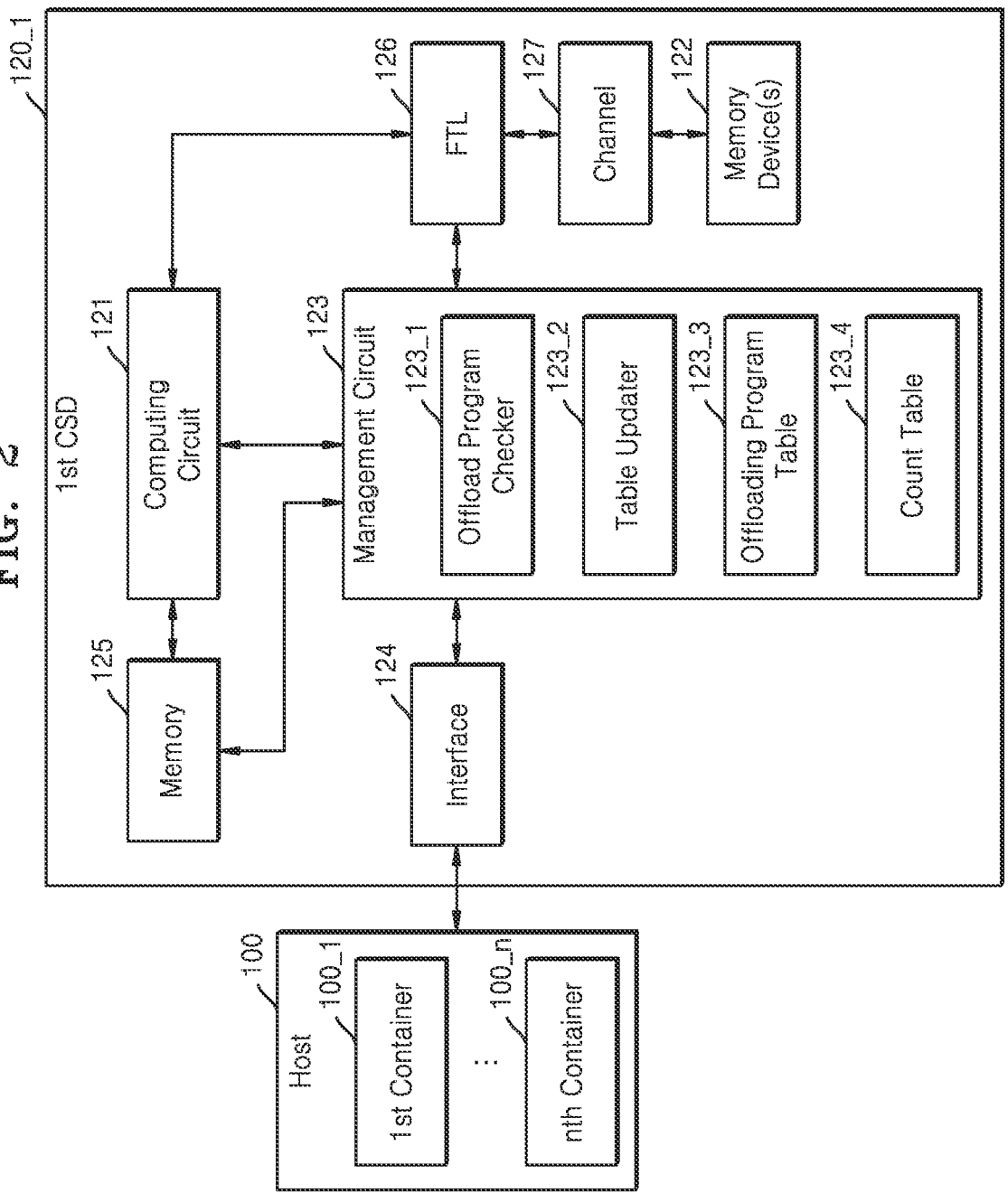
FIG. 2 is a block diagram further illustrating in one example the first computing storage device of FIG. 1.

FIG. 2 is a block diagram further illustrating in one example the first computing storage device 120_1 of FIG. 1. Here, the first computing storage device 120_1 is assumed to perform a memory operation in response to a request received from the host 100, wherein the first computing storage device 120_1 manages offloading programs in response to an offloading request from the host 100 and performs a processing operation using the offloading program. Those skilled in the art will further appreciate that description of the first computing storage device 120_1 may be analogously applied to one or more of the second to k-th computing storage devices 120_2 to 120_k of FIG. 1.

Referring to FIG. 2, the host 100 is assumed to include first to n-th containers 100_1 to 100_n (where 'n' is a positive integer). Here, it is further assumed that each container corresponds to a user accessing a service from an electronic system and may be defined as a virtual block performing general operations in relation to the provision of a service requested by a user as indicated by a corresponding request. In some embodiments, a container may be referred to as a virtual machine. Accordingly, the first to n-th containers 100_1 to 100_n may respectively perform operations corresponding to requests from first to n-th users in parallel or in sequence. In some embodiments, at least some of the first to n-th containers 100_1 to 100_n may communicate the same offloading program to the first computing storage device 120_1, and the first computing storage device 120_1 may perform processing operation(s) by managing the same offloading program received a number of times.

In the illustrated example of FIG. 2, the first computing storage device 120_1 may include in addition to the computing circuit 121, the memory device 122, and the management circuit 123; an interface 124, at least one memory device (hereafter singularly or collectively, "memory") 125, a flash translation layer (FTL) 126, and a channel 127. Here, the memory 125 may be referred to simply as a memory device.

The interface 124 may receive a plurality of offloading requests and a plurality of offloading programs from the first to n-th containers 100_1 to 100_n. In some embodiments, the interface 124 may communicate results of performing processing operations using the offloading programs to the first to n-th containers 100_1 to 100_n.

In some embodiments, the management circuit 123 may include an offloading program checker 123_1, a table updater 123_2, an offloading program table 123_3, and a count table 123_4.

In some embodiments, the offloading program checker 123_1 may be used to determine (or check) whether an offloading program (or offloading programs) is (are) the same as (or is identical to) an offloading program (or offloading programs) already stored in the offloading program table 123_3 from among a plurality of offloading programs received through the interface 124. That is, the offloading program checker 123_1 may check an offloading program (or offloading programs) stored in the offloading program table 123_3 among a plurality of received offloading programs. For example, the offloading program checker 123_1 may compare a plurality of offloading programs received through the interface 124 with an offloading program (or offloading programs) stored in the offloading program table 123_3 on a bit-by-bit basis in order to determine sameness (or identicalness) therebetween. Alternately, the offloading program checker 123_1 may generate keys by applying one or more hash function(s) to each of a plurality of offloading programs received through the interface 124 in order to determine whether offloading programs respectively stored in slots of the offloading program table 123_3 corresponding to the generated keys.

In some embodiments, the table updater 123_2 may skip (or omit) storage of an offloading program (or offloading programs), which are deemed identical to an offloading program (or offloading programs) already stored in the offloading program table 123_3 among a plurality of received offloading programs in the offloading program table 123_3 and thereafter selectively store an offloading program (or offloading programs) which are not identical to an offloading program (or offloading programs) stored in the offloading program table 123_3 among the received offloading programs in the offloading program table 123_3. In this regard, the phrase "storing an offloading program in the offloading program table" is used to denote one or more memory operation(s) (e.g., a write operation or a program operation) whereby one or more offloading program(s) may be stored in one or more designated offloading program table(s).

In some embodiments, the table updater 123_2 may be used to update the count table 123_4 in response to a plurality of received offloading programs. That is, the table updater 123_2 may increase count(s) associated with the count table 123_4—such as for example, various counts respectively corresponding to a plurality of offloading programs in order to effectively manage remaining number(s) of processing operations related to the respective offloading program that the computing circuit 121 will later require. Thus, the table updater 123_2 may decrease a count of the count table 123_4 corresponding to the first offloading program when a processing operation using the first offloading program is completed by the computing circuit 121.

In some embodiments, the management circuit 123 may perform memory allocation operations for the memory 125 in response to the count table 123_4. In this regard, the memory 125 may serve as a cache (or buffer) for the computing circuit 121. The management circuit 123 may allocate a large memory region in the memory 125 to an offloading program corresponding to a count having a large value, such that the computing circuit 121 may support high-speed processing for the offloading program corresponding to the count having a large value. As a result, the computing circuit 121 may support a high processing speed by performing processing operations using the corresponding offloading program in parallel, as much as possible, using the large memory region in the memory 125. Further in this regard, the management circuit 123 may provide a signal indicating memory allocation information to the computing circuit 121.

In some embodiments, the management circuit 123 may store the offloading program table 123_3 and the count table 123_4 in the memory device 122 (e.g., in accordance with a flash memory protocol) using the FTL 126 and the channel 127. Here, the management circuit 123 may read and manage the offloading program table 123_3 and the count table 123_4 from the memory device 122.

In some embodiments, the computing circuit 121 may perform a processing operation in response to the offloading program table 123_3 and the count table 123_4. That is, the computing circuit 121 may read a first offloading program from the offloading program table 123_3 and perform a processing operation using the first offloading program a number of times, as indicated by a count in the count table 123_4 corresponding to the first offloading program. For example, the computing circuit 121 may access the memory 125 to write or read data generated by performing a processing operation using the first offloading program. In some embodiments, the computing circuit 121 may provide a signal indicating completion of a processing operation to the management circuit 123 in order to better manage the count table 123_4 of the table updater 123_2. However, although the illustrated example of FIG. 2 assumes that the computing circuit 121 performs a processing operation using the memory 125, the inventive concept is not limited thereto, and the computing circuit 121 may alternately or additionally perform a processing operation using the memory device 122.

In some embodiments, the computing circuit 121 may determine an order in which the plurality of processing operations will performed in response to at least one of, for example; an order in which the plurality of offloading programs were received, capacity of the memory 125, and the count table 123_4. Then, the computing circuit 121 may perform the processing operations according to the determined order.

In some embodiments, after performing the processing operations, the computing circuit 121 may return results indicating the performing of the processing operations to the containers in accordance with the previously received offloading requests to the computing circuit 121 from the first to n-th containers 100_1 to 100_n.

Figure 3:
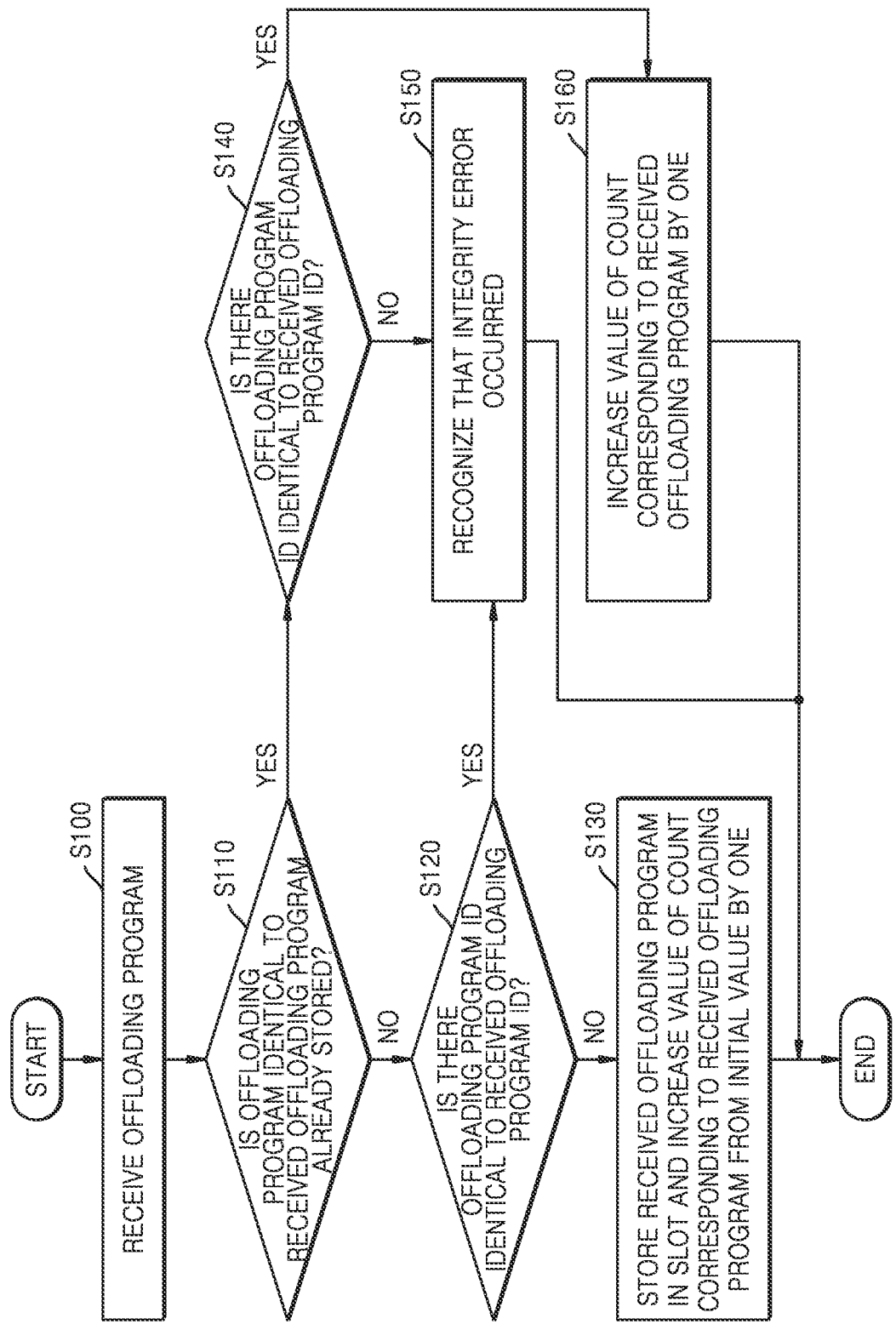
FIG. 3 is a flowchart illustrating in example a method of operating a storage device according to embodiments of the inventive concept.

FIG. 3 is a flowchart illustrating in one example a method of operating a storage device according to embodiment of the inventive concept.

Referring to FIG. 3, a storage device according to an embodiment of the inventive concept may receive an offloading program from a host (S100). For example, the storage device may receive an offloading program from one or more containers associated with a host. The storage device may then determine whether the received offloading program is identical to a previously received and stored offloading program (S110). For example, the storage device may check whether the received offloading program is identical to a received offloading program already stored in an offloading program table. Upon determining that received offloading program is not identical (S110=NO), the storage device may further determine whether there is an offloading program identification (ID) identical to the received offloading program ID in the storage device (S120). That is, the received offloading program ID may correspond to information received from a host together with an offloading program to check the integrity of the offloading program. Accordingly, the same offloading programs may have the same program IDs. In some embodiments, a storage device may store and manage an offloading program and an offloading program ID corresponding thereto in the same slot in an offloading program table. In this case, the storage device may check the sameness by comparing offloading program IDs stored in the offloading program table with a received offloading program ID. When IDs are not identical (S120=NO), the storage device may store the received offloading program in a slot of the offloading program table and may increase a count (e.g., by an increment of one) stored in the count table and corresponding to the received offloading program (e.g.) from the initial value.

However, upon determining that received offloading program is identical (S110=YES), the storage device may determine whether there is an offloading program ID identical to a received offloading program ID (S140). Upon determining that there is an offloading program ID that is identical (S140=YES), the storage device may increase the count corresponding to the received offloading program (S160). However, upon determining that there is not an offloading program ID that is identical (S140=NO) or upon determining that the IDs are identical (S120=YES), the storage device may recognize that an integrity error has occurred in the received offloading program and may communicate an integrity error notification to the host (S150).

From the foregoing it will be understood that a storage device according to embodiments of the inventive concept may check integrity of an offloading program using an offloading program ID in preparation for a case wherein a partially modified offloading program is received from (e.g.) a malicious user through a container of the host, thereby improving overall security performance.

Figure 4B:
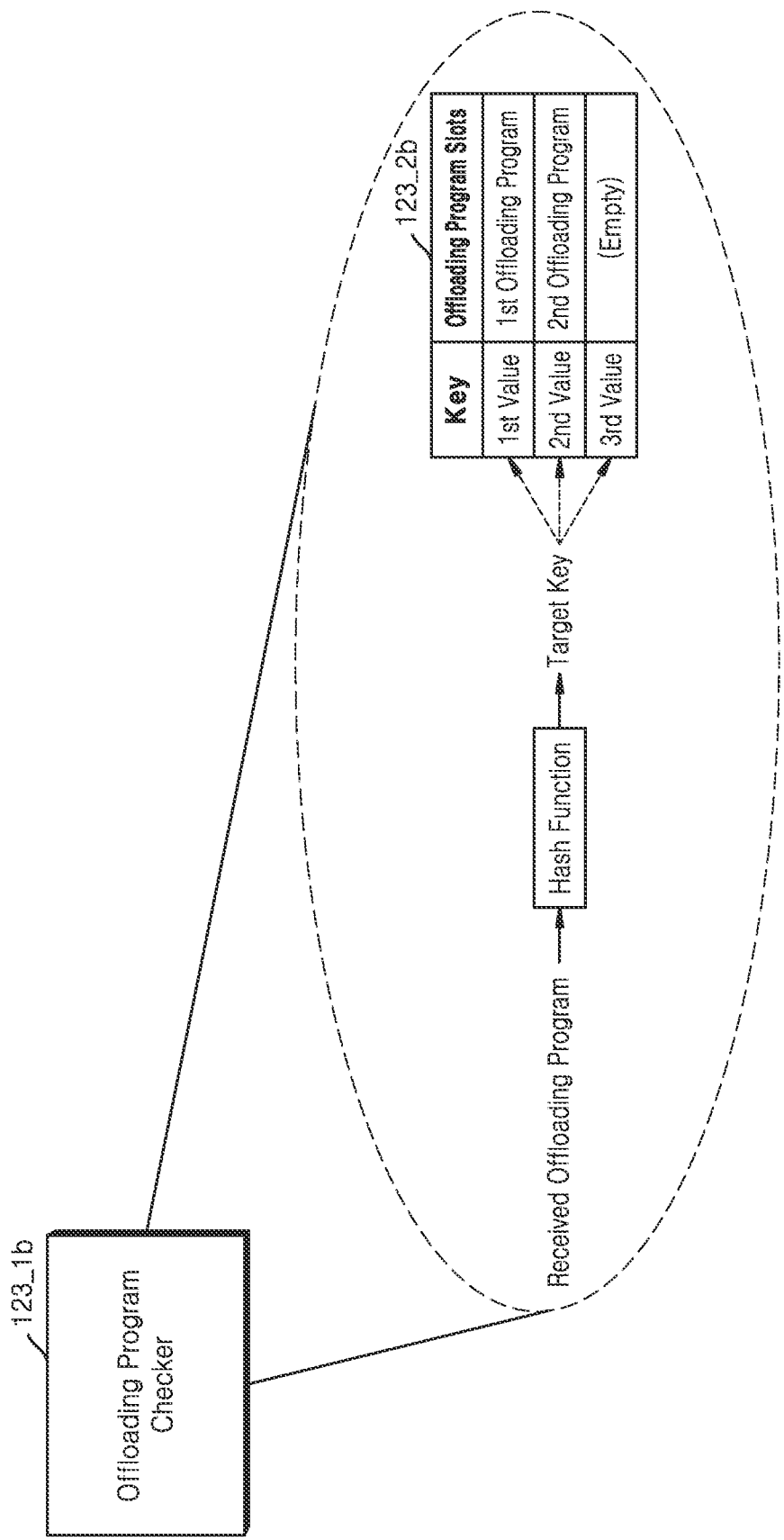

FIGS. 4A and 4B are respective conceptual diagrams illustrating operation of offloading program checkers 123_1a and 1231_b according to embodiments of the inventive concept. Here, FIGS. 4A and 4B may be understood as possible approaches related to method step S110 of FIG. 3.

Referring to FIG. 4A, the offloading program checker 1231_a may perform a binary check on a received offloading program with respect to each of first and second offloading programs stored in slots of an offloading program table 123_3a. In some embodiments, the offloading program checker 1231_a may compare the received offloading program with a first offloading program on a bit-by-bit basis (e.g., in relation to a counted number of bits and/or a reference number of bits) in order to check for sameness between the received offloading program and the first offloading program. Upon determining that the received offloading program is not identical to the first offloading program, the offloading program checker 1231_a may compare the received offloading program with a second offloading program on a bit-by-bit basis (e.g., in relation to a counted number of bits and/or a reference number of bits) in order to check for sameness between the received offloading program and the second offloading program.

Referring to FIG. 4B, the offloading program checker 123_1b may generate a target key by applying a hash function to the received offloading program and compare a generated target key with first to third values respectively indicating slots of the offloading program table 123_3b. The offloading program checker 123_1b may check whether an offloading program identical to the received offloading program is stored in the offloading program table 123_3b, based on whether an offloading program is stored in a slot indicated by a value identical to the target key from among the first to third values. In some embodiments, when the target key has a first value, an offloading program checker 123_1b may determine that a first offloading program identical to the received offloading program is stored in a slot of the offloading program table 123_3b indicated by a key having the first value. In some embodiments, when the target key has a third value, the offloading program checker 123_1b may determine that no offloading program identical to the received offloading program is stored in the offloading program table 123_3b.

Figure 5A:
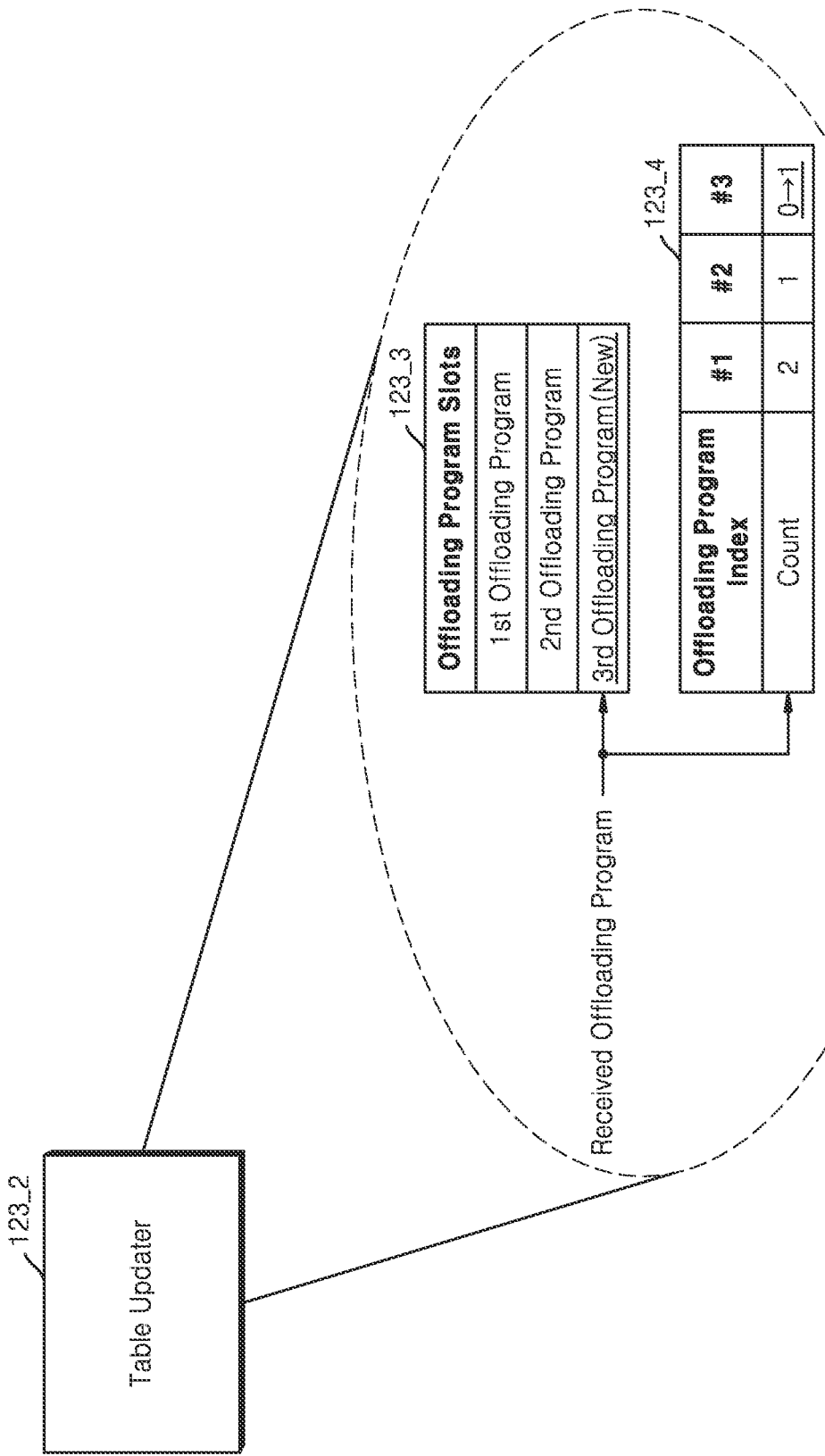
FIGS. 5A and 5B are respective conceptual diagrams illustrating operation of a table updater according to embodiments of the inventive concept.
Figure 5B:
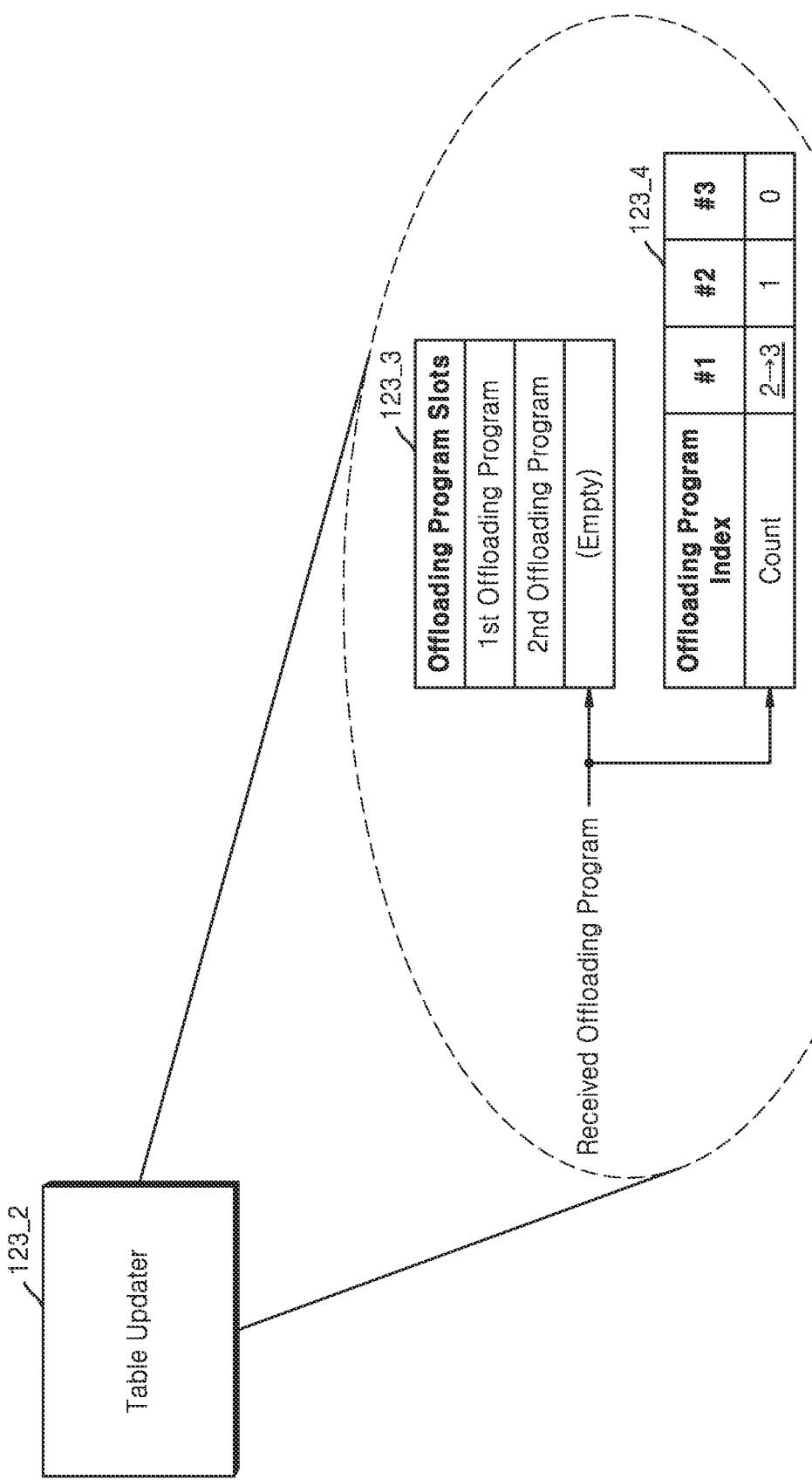

FIGS. 5A and 5B are respective conceptual diagrams illustrating operations related to the table updater 123_2 according to embodiments of the inventive concept. Here, FIGS. 5A and 5B may be understood as possible approaches related to method steps S130 and 160 of FIG. 3.

Referring to FIG. 5A, when a received offloading program is deemed a third offloading program (or a "new" offloading program not previously received and stored in relation to the offloading program table 123_3), the table updater 123_2 may store the third offloading program in an arbitrary slot of the offloading program table 123_3. Also, the table updater 123_2 may increase a count associated with an index '#3' corresponding to the third offloading program from an initial value of '0' to a value of '1' in the count table 123_4. In the count table 123_4, the value of a count having an index '#1' corresponding to a first offloading program is '2' and indicates that the remaining number of processing operations using the first offloading program to be performed is '2', the value of a count having an index '#2' corresponding to a second offloading program is '1' and indicates that the remaining number of processing operations using the second offloading program to be performed is '1', and the value of a count having the index '#3' corresponding to the third offloading program is '1' and indicates that the remaining number of processing operations using the third offloading program to be performed is '1'.

Referring to FIG. 5B, when the received offloading program is the first offloading program that has already been stored in the offloading program table 123_3, the table updater 123_2 may omit an operation of storing the received offloading program in the offloading program table 123_3. Additionally, the table updater 123_2 may increase a count associated with the index '#1' and corresponding to the first offloading program by one from a count value of '2' to a count value of '3' in the count table 123_4.

Figure 6:
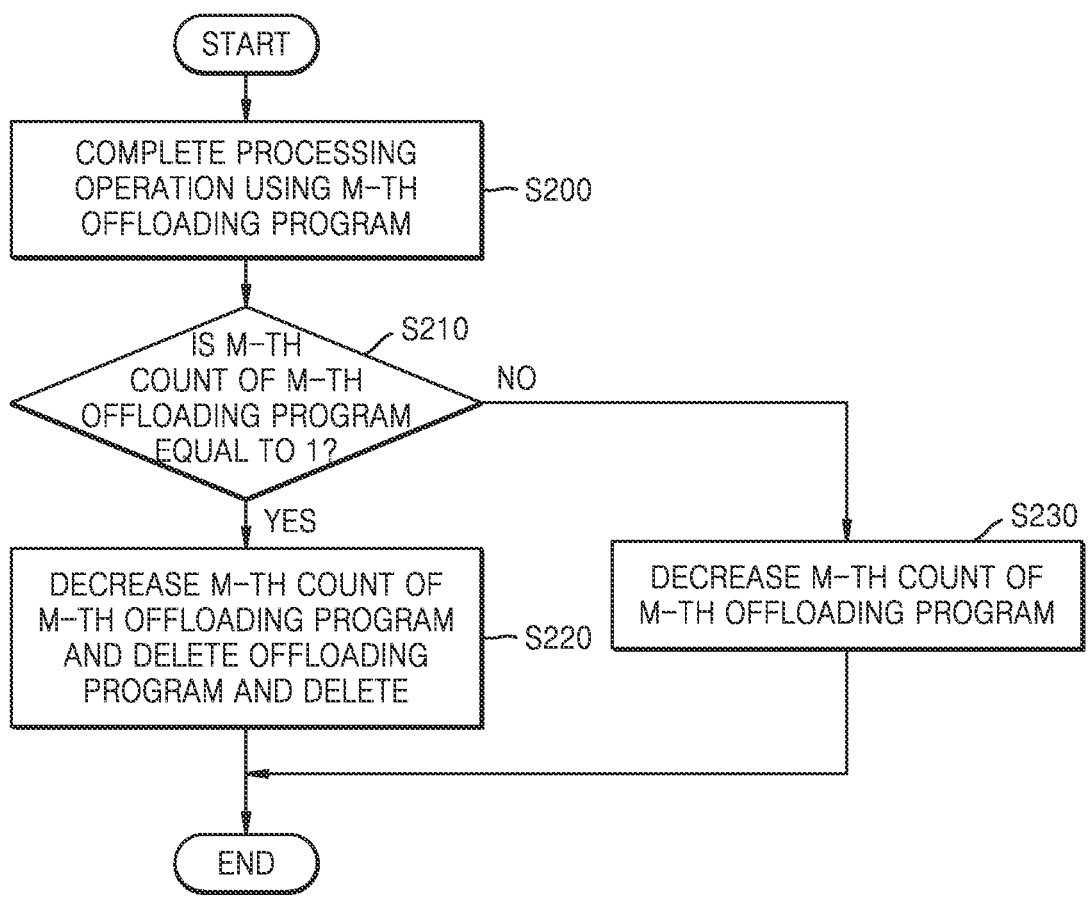
FIG. 6 is a flowchart illustrating in another example a method of operating a storage device according to embodiments of the inventive concept.

FIG. 6 is a flowchart illustrating in one example a method of operating a storage device, according to embodiments of the inventive concept. More particularly, FIG. 6 illustrates a method by which a storage device manages an offloading program table and a count table following completion of a processing operation using an offloading program.

Referring to FIG. 6, the storage device may complete a processing operation using an m-th (where 'm' is a positive integer) offloading program (S200). That is, the storage device may perform a processing operation using the m-th offloading program stored in the offloading program table and provide a result of the processing operation to a container associated with a host. Thereafter, the storage device may receive a release request for the m-th offloading program from the corresponding container. Here, completion of a processing operation by the storage device may include reception of a release request for a corresponding offloading program from the host (or a container). Then, the storage device may determine whether an m-th count corresponding to the m-th offloading program in the count table is equal to '1' (S210). Upon determining that the m-th count corresponding to the m-th offloading program in the count table is equal to '1' (S210=YES), the storage device may decrease the m-th count of the m-th offloading program by one to an initial value of '0', and delete the m-th offloading program from the offloading program table (S220). However, upon determining that the m-th count corresponding to the m-th offloading program in the count table is not equal to '1' (S210=NO), the storage device may decrease the m-th count of the m-th offloading program by one and continue managing the m-th offloading program still stored in the offloading program table (S230).

Figure 7A:
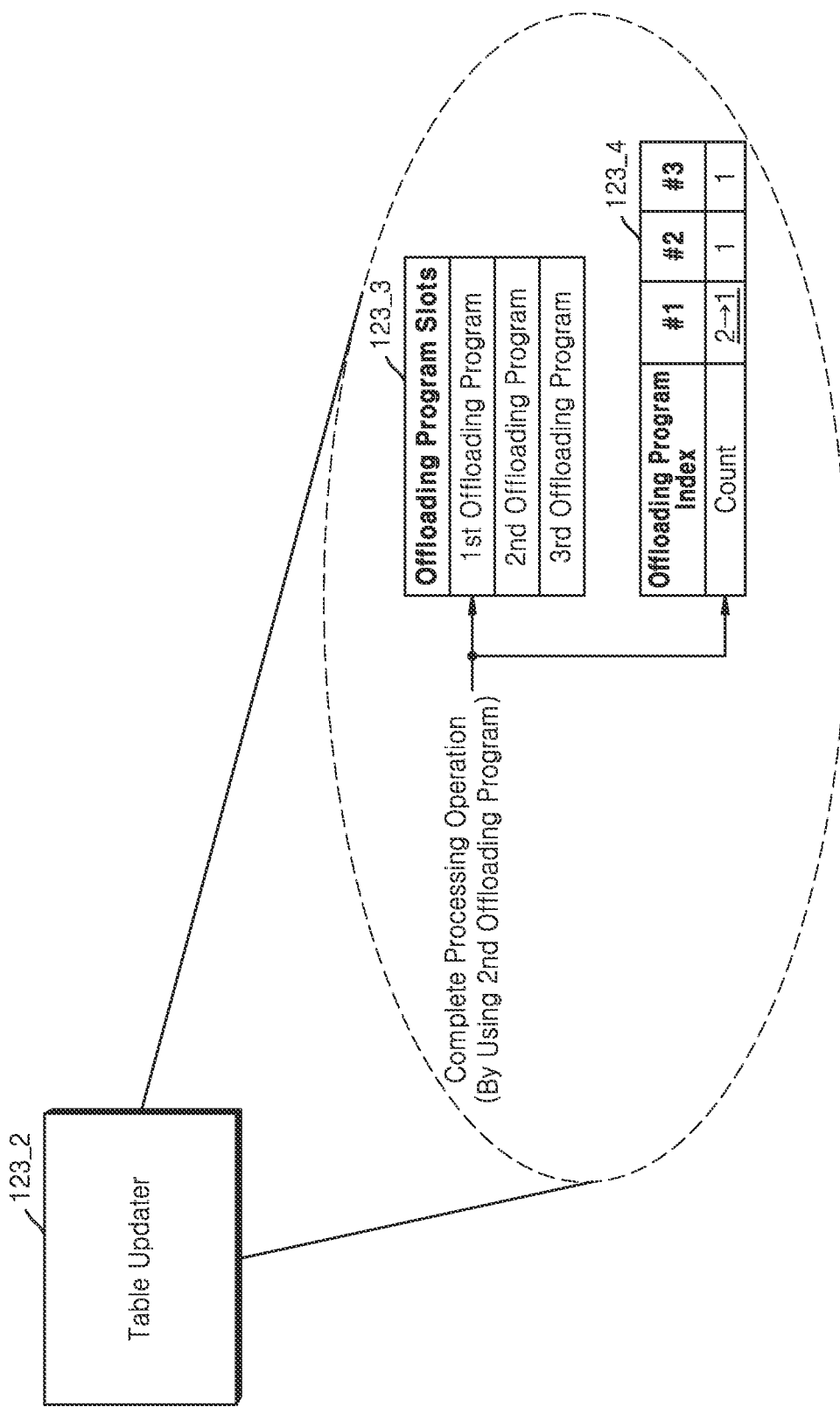
FIGS. 7A and 7B are respective conceptual diagrams illustrating operation of a table updater according to embodiments of the inventive concept.
Figure 7B:
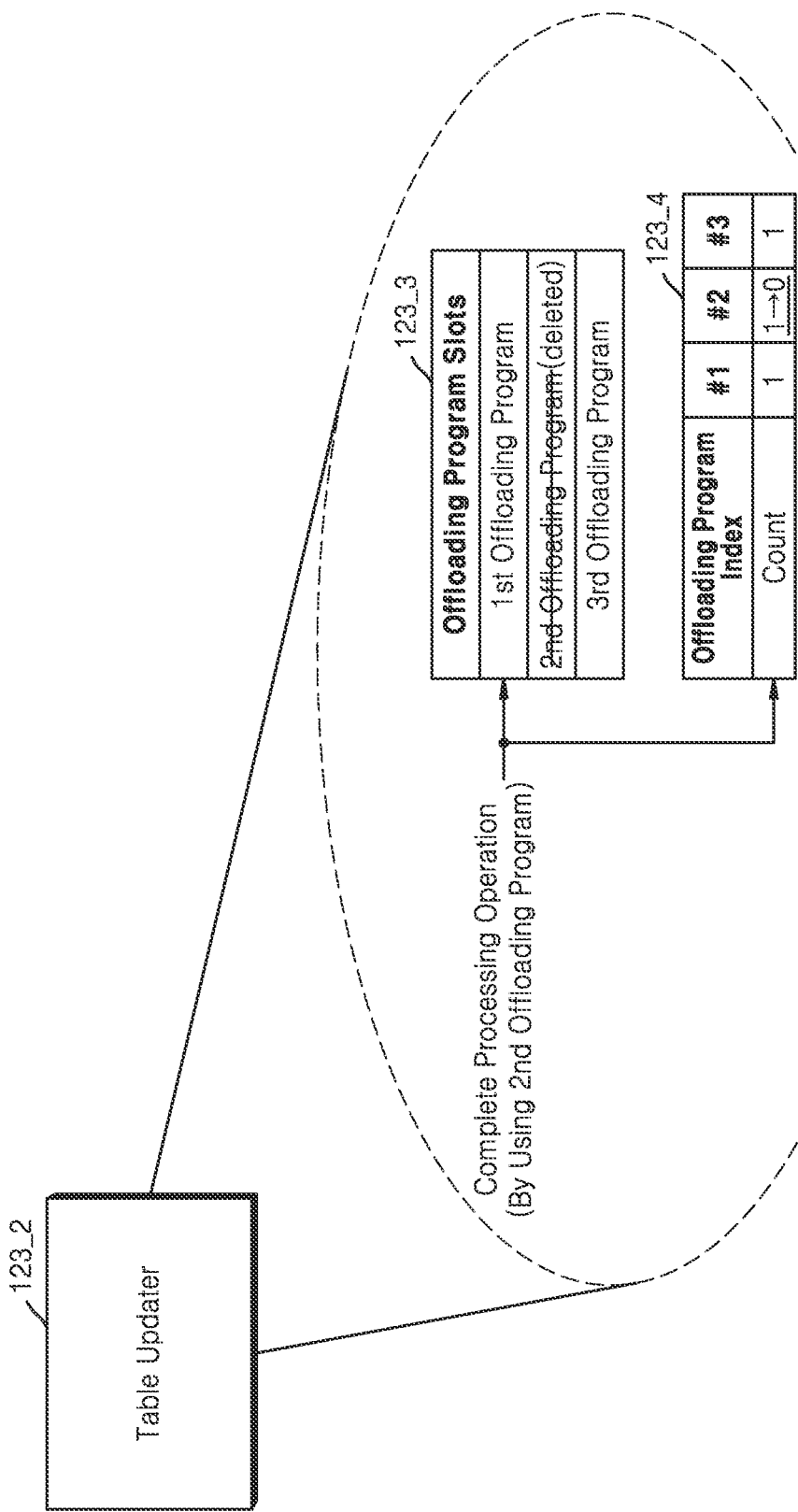

FIGS. 7A and 7B are respective conceptual diagrams illustrating operations related to the table updater 123_2 according to embodiments of the inventive concept. Here, FIGS. 7A and 7B may be understood as possible approaches related to method steps S220 and S230 of FIG. 6.

Referring to FIG. 7A, when a processing operation using a first offloading program is completed, the table updater 123_2 may decrease the value of a count associated with the index '#1' corresponding to the first offloading program in the count table 123_4 by one from a count value of '2' to a count value of '1'. Because the value of the count associated with the index '#1' is still non-zero (e.g., a count value of '1'), the table updater 123_2 may continue managing the first offloading program still stored in the offloading program table 123_3 for one processing operation to later be performed using the first offloading program.

Referring to FIG. 7B, when a processing operation using a second offloading program is completed, the table updater 123_2 may decrease the value of a count associated with the index '#2' corresponding to the second offloading program in the count table 123_4 by one from a count value of '1' to a count value '0'. Because the initial value of a count associated with the index '#2' is now '0', the table updater 123_2 may determine that there are no more processing operations to later be performed using the second offloading program, and delete the second offloading program from the offloading program table 123_3.

Figure 8:
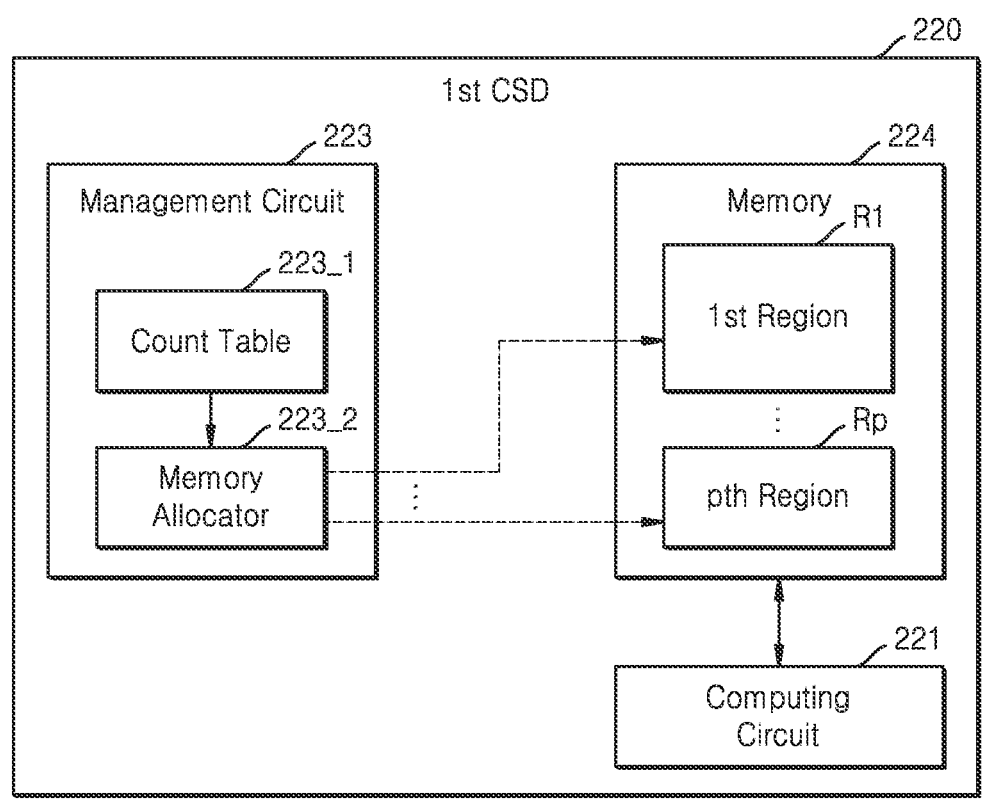
FIG. 8 is a block diagram illustrating in another example a computing storage device according to embodiments of the inventive concept.

FIG. 8 is a block diagram further illustrating in one example a first computing storage device 220 according to embodiments of the inventive concept.

Referring to FIG. 8, the first computing storage device 220 may include a computing circuit 221, a management circuit 223, and a memory 224. The management circuit 223 may include a count table 223_1 and a memory allocator 223_2. In some embodiments, the memory allocator 223_2 may perform a memory allocation operation with respect to the memory 224 in relation to a processing operation of the computing circuit 221 in response to the count table 223_1. In some embodiments, the memory allocator 223_2 may refer to the count table 223_1 and allocate first to p-th (where p is an integer greater than or equal to 1) regions R1 to Rp to different offloading programs, respectively, such that larger memory regions are allocated to offloading programs with larger numbers of currently remaining processing operations. Here, a memory region allocated to an offloading program may be interpreted as a memory region allocated when the computing circuit 221 performs a processing operation using the corresponding offloading program.

Although FIG. 8 assumes that the memory 224 is divided into first to p-th regions R1 to Rp and allocated, this is merely an illustrative example and the inventive concept is not limited thereto. Of note, at least some of the first to p-th regions R1 to Rp may overlap (e.g., not be separately or uniquely designated).

Figure 9:
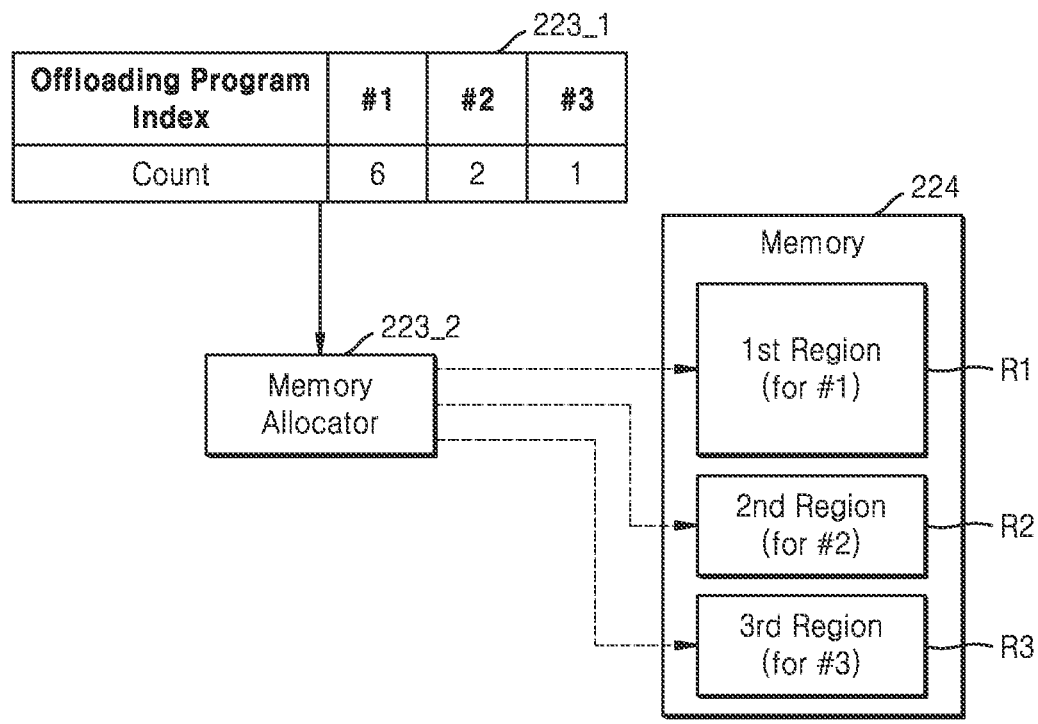
FIG. 9 is a conceptual diagram further illustrating aspects of the method of FIG. 8.

FIG. 9 is a conceptual diagram further illustrating operation of the management circuit 223 and the memory 224 of FIG. 8.

Referring to FIGS. 8 and 9, it is assumed that the memory allocator 223_2 checks in relation to the count table 223_1 the value of a count associated with the index '#1' corresponding to the first offloading program (e.g., a current count value of '6') and allocates a first region R1 of the memory 224 to the performing of processing operations using the first offloading program. Then, the computing circuit 221 may then perform in parallel at least some of '6' processing operations using the first offloading program and the first region R1.

It is further assumed that the memory allocator 223_2 checks in relation to the count table 223_1 the value of a count associated with the index '#2' corresponding to the second offloading program (e.g., a current count value of '2') and allocates a second region R2 of the memory 224 to the performing of processing operations using the second offloading program. Then, the computing circuit 221 may perform up to two processing operations in parallel using the second offloading program and the second region R2.

Also, the memory allocator 223_2 may check from the count table 223_1 that the value of a count having the index '#3' corresponding to the third offloading program is '1' and allocate a third region R3 to perform a processing operation using the third offloading program. The computing circuit 221 (FIG. 8) may perform '1' processing operation using the third offloading program through the third region R3.

In some embodiments, the first region R1, the second region R2, and the third region R3 of the memory 224 may include relatively large areas in the order stated. That is, the memory allocator 223_2 may allocate a larger memory region in relation to a corresponding offloading program only when the value of a corresponding count exceeds a reference value, yet allocate memory regions having a lesser size for offloading programs corresponding to counts having values less than or equal to the reference value.

Alternately, the memory allocator 223_2 may allocate memory space provided by the memory 224 to offloading programs in various ways with reference to the count table 223_1, such that the computing circuit 221 may quickly perform a plurality of processing operations using the corresponding offloading programs.

Figure 10:
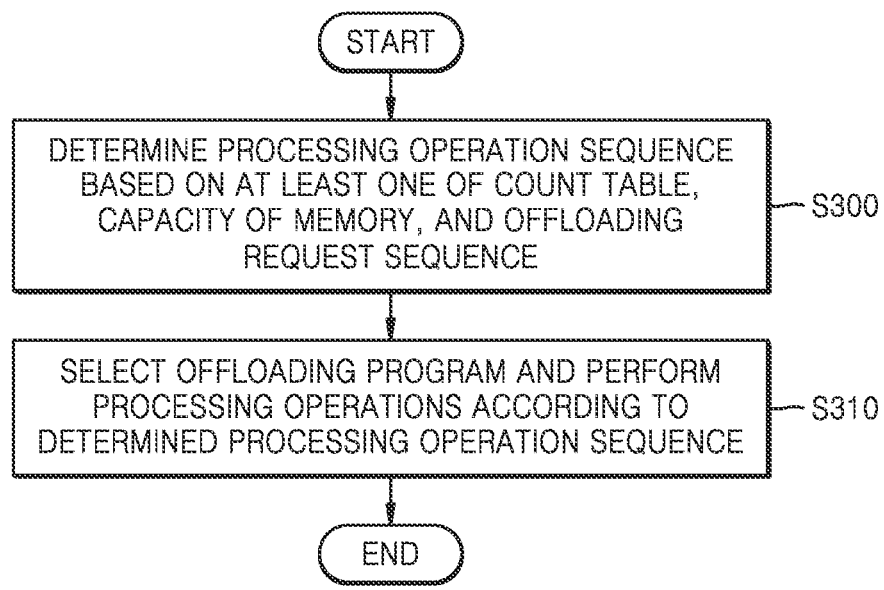
FIG. 10 is a flowchart illustrating in still another example a method of operating a storage device according to embodiments of the inventive concept.

FIG. 10 is a flowchart illustrating in one example a method of operating a storage device, according to embodiments of the inventive concept, wherein the method determines a sequence of processing operations when a storage device performs processing operations using different offloading programs.

Referring to FIGS. 8 and 10, the storage device may determine a processing operation sequence for processing operations using different offloading programs in response to (or based on) a count table, memory capacity, and an offloading request sequence (S300). For example, the storage device may perform processing operations related to offloading programs corresponding to counts having relatively large count values in the count table for remaining processing operations on a higher priority basis. For example, the storage device may determine a processing operation sequence to utilize the capacity of the memory 224 with greatest efficiency considering the capacity of the memory 224. In some embodiments, the storage device may determine a processing operation sequence in accordance with an order in which the offloading requests were received. In other embodiments, the storage device may determine a processing operation sequence by applying weights to respective count values in the count table in relation to memory capacity and a sequence of offloading requests. Then, the storage device may sequentially select offloading programs from among different offloading programs according to a determined processing operation sequence and perform processing operations corresponding thereto (S310).

Figure 11A:
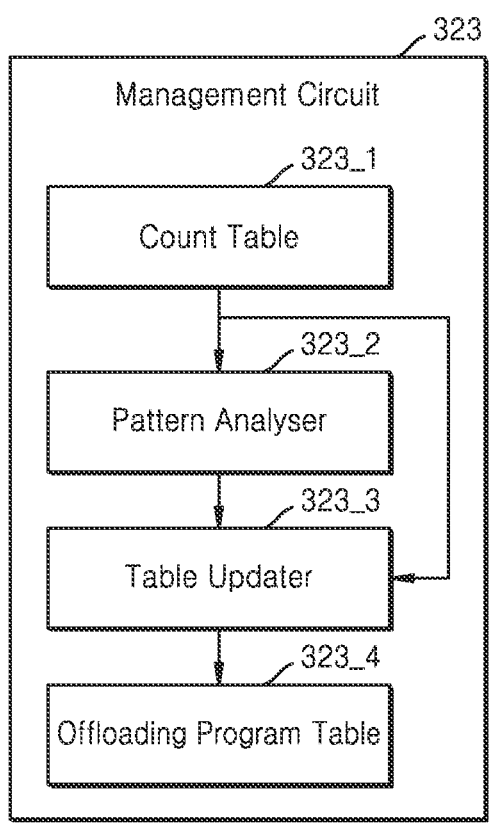
FIG. 11A is a block diagram illustrating in one example a management circuit according to embodiments of the inventive concept.

FIG. 11A is a block diagram illustrating in one example a management circuit 323 according to embodiments of the inventive concept. Here, the management circuit 323 may be understood as one possible implementation example of the management circuit 123 of FIG. 2. And FIG. 11B is a table illustrating parameters related to patterns analyzed by the pattern analyzer 323_2 of FIG. 11A.

Referring to FIG. 11A, the management circuit 323 may include a count table 323_1, the pattern analyzer 323_2, a table updater 323_3, and an offloading program table 323_4.

In some embodiments, the pattern analyzer 323_2 may analyze patterns of counts of the count table 323_1 by tracking changes in values of the counts for a defined period. Referring further to FIG. 11B, the pattern analyzer 323_2 may analyze patterns of counts according to at least one of parameters including a change interval of each count, a maximum value of each count in a certain interval, an average value of each count in a certain interval, and whether an offloading program corresponding to each count is a hot offloading program or a cold offloading program in a certain period, as shown in a pattern table P_TB. In some embodiments, the pattern analyzer 323_2 may periodically or aperiodically analyze patterns of counts and update the patterns. The parameters of FIG. 11B may be defined in advance based on histories regarding reception of offloading programs respectively corresponding to counts of the count table 323_1, after values of the counts become '0'. For example, times and probabilities that a first offloading program is expected to be received after a first count corresponding to the first offloading program becomes '0,' or the like, may be predicted based on a plurality of histories regarding receiving of the first offloading program after the first count becomes '0.' The parameters of FIG. 11B regarding the first offloading program may be defined in advance based on a result of the prediction. However, the parameters of FIG. 11B are merely an embodiment, and, without being limited thereto, other parameters may be additionally defined or some parameters defined in FIG. 11B may be excluded. Patterns analyzed through the pattern analyzer 323_2 may be considered when deleting offloading programs from the offloading program table 323_4. The table updater 323_3 may manage deletion of offloading programs from the offloading program table 323_4, based on the count table 323_1 and patterns of the counts.

In contrast to the embodiment of FIG. 7B in which a corresponding offloading program is immediately deleted from the offloading program table 123_3 when the value of a count becomes '0', in the embodiment of FIG. 11A, a pattern of a count may be taken into account together with the value of the count in the case of deleting an offloading program from the offloading program table 123_3. That is, even when all processing operations using a corresponding offloading program have been completed (e.g., a value of a count corresponding to the corresponding offloading program reaches an initial value), when the corresponding offloading program is expected to be received during a certain period of time, the management circuit 323 of FIG. 11A may maintain a copy of the corresponding offloading program in the offloading program table 323_4 for the certain period of time, thereby preventing potentially needless expenditure of resources required to delete and then re-store the corresponding offloading program in the offloading program table 323_4.

Figure 12:
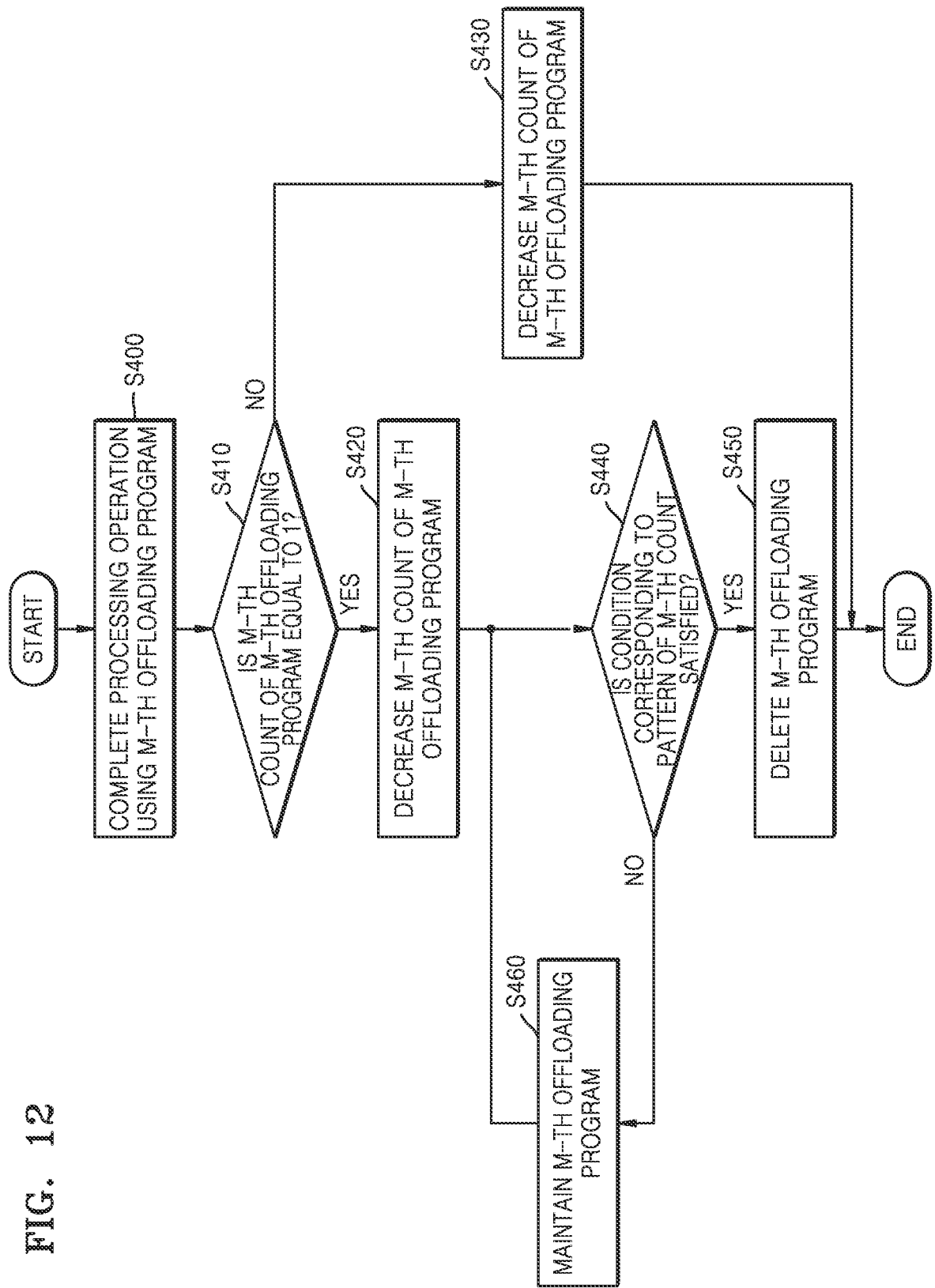
FIG. 12 is a flowchart illustrating in still another example a method of operating a storage device according to embodiments of the inventive concept.

FIG. 12 is a flowchart illustrating a method of operating a storage device according to embodiments of the inventive concept. Here, in some embodiments, the method of FIG. 12 may be performed in relation to the management circuit 323 of FIG. 11A.

Referring to FIG. 12, a storage device may complete a processing operation using an m-th offloading program (S400). Then, the storage device may determine whether the value of an m-th count corresponding to the m-th offloading program in a count table is '1' (S410). Upon determining that the value of an m-th count corresponding to the m-th offloading program in a count table is '1' (S410=YES), the storage device may decrease the value of the m-th count corresponding to the m-th offloading program to an initial value of '0' (S420). However, upon determining that value of an m-th count corresponding to the m-th offloading program in a count table is not '1' (S410=NO), the storage device may decrease the value of the m-th count corresponding to the m-th offloading program by one (S430).

After decreasing the value of the m-th count corresponding to the m-th offloading program to the initial value of '0' (S420), the storage device may determine whether the value of the m-th count satisfies a condition matching the pattern of the m-th count while maintaining the initial value (S440). For example, in some embodiments, the condition may correspond to a condition in which a timer associated with the pattern of the m-th count expires. Alternately, the condition may correspond to a state in which processing operations using at least one offloading program different from the m-th offloading program are performed a number of times corresponding to the pattern of the m-th count. Further in this regard, various conditions potentially associated with method steps S440 will be described hereafter in some additional detail with reference to FIGS. 13A, 13B, and 14.

Upon determining that the value of the m-th count satisfies the condition matching the pattern of the m-th count (S440=YES), the storage device may delete the m-th offloading program from an offloading program table (S450). However, upon determining that the value of the m-th count does not satisfy the condition matching the pattern of the m-th count (S440=NO), the storage device may maintain a state in which the m-th offloading program is stored in the offloading program table and repeat method step S440 (S460).

Figure 13A:
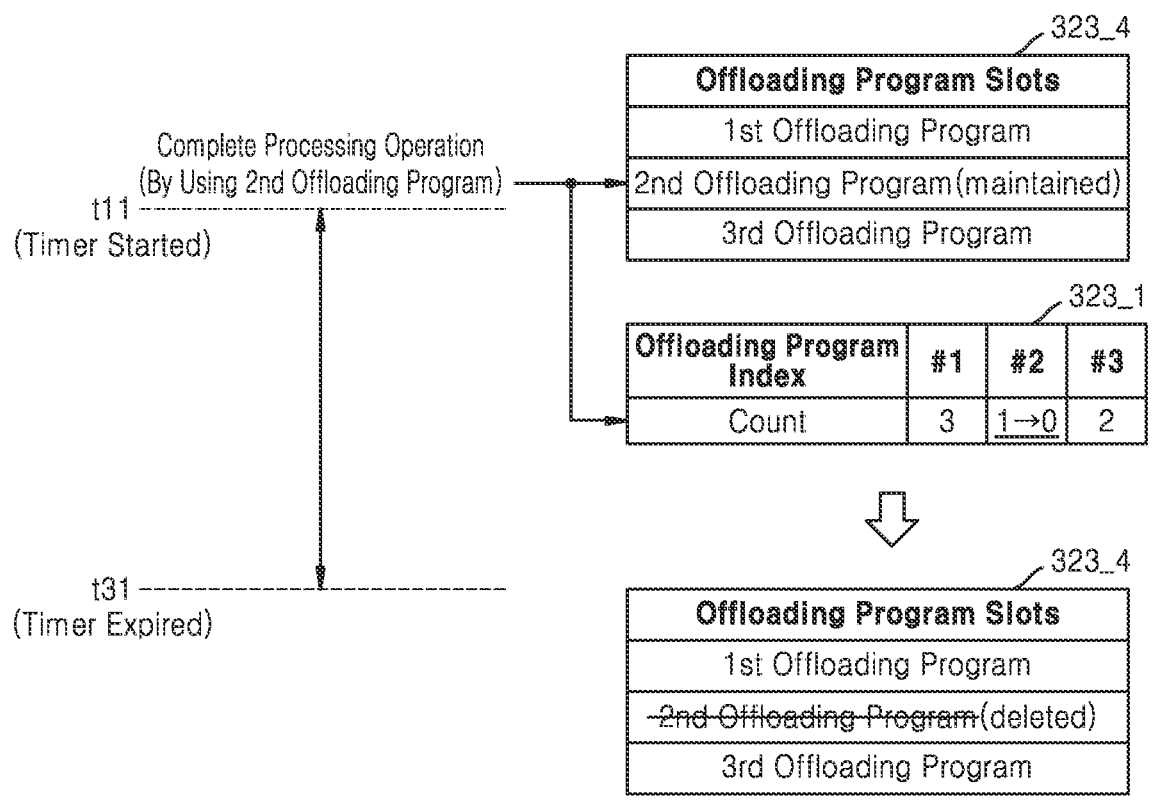
FIGS. 13A, 13B and 14 are respective conceptual diagrams further illustrating possible approaches to the method step S420 in the method of FIG. 12.
Figure 13B:
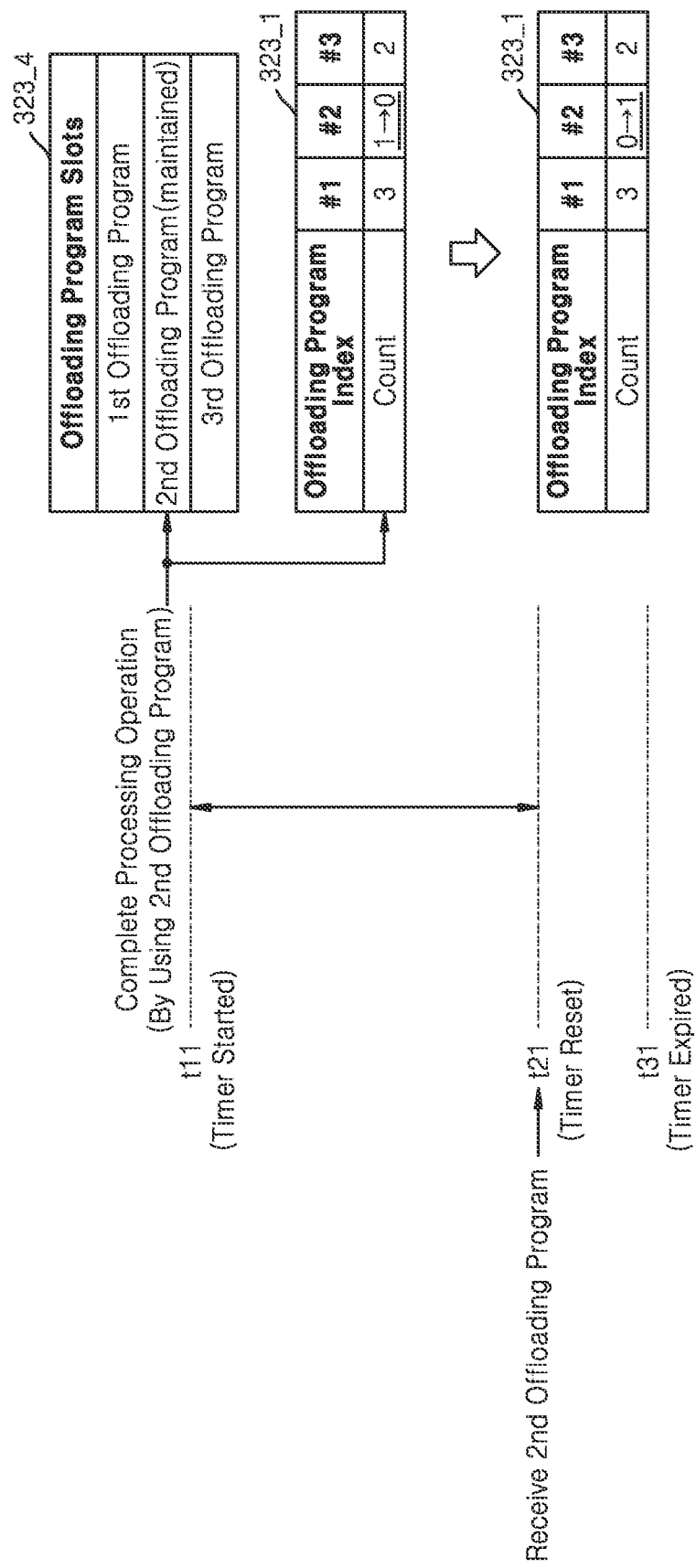
Figure 14:
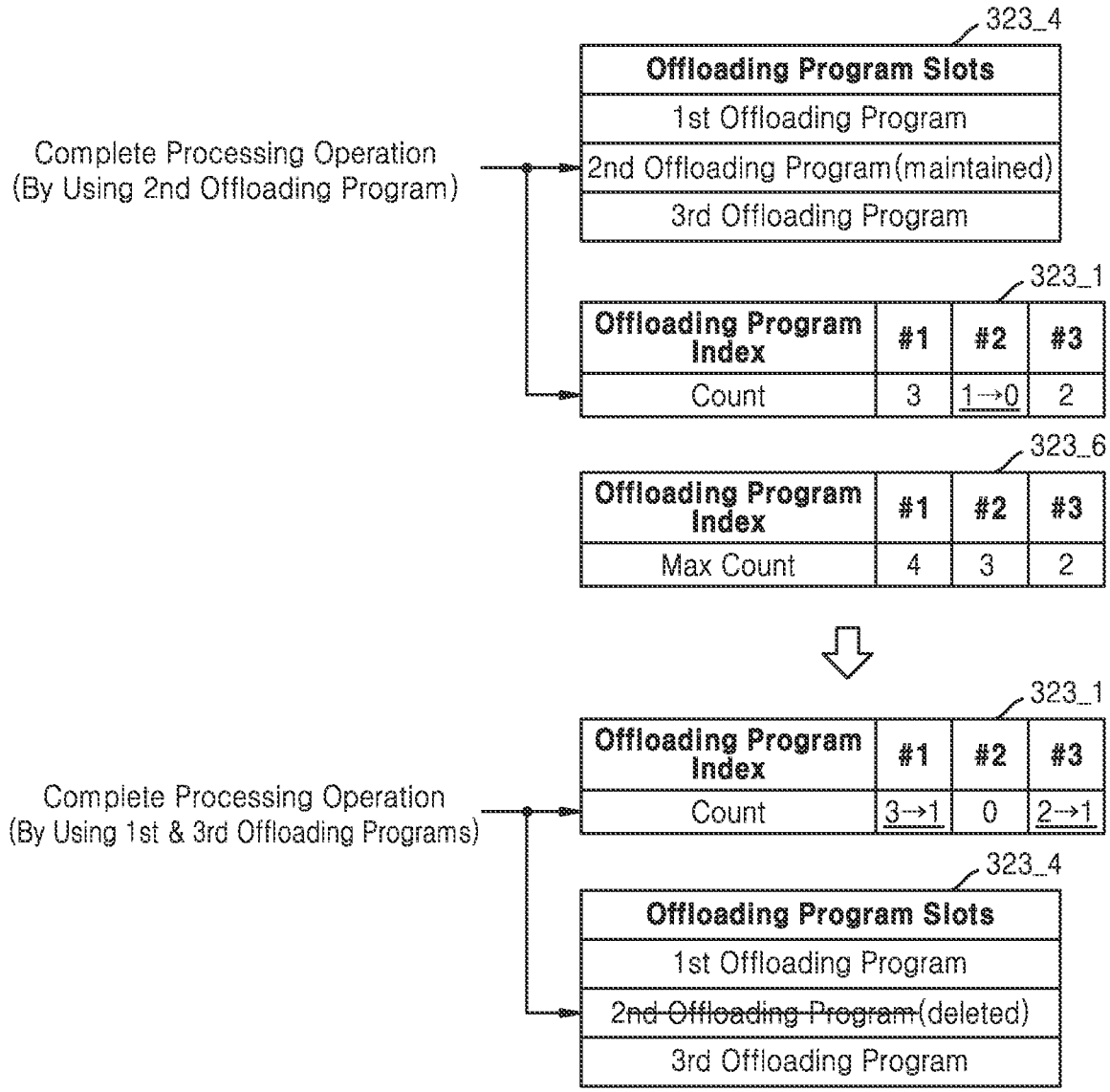

FIGS. 13A, 13B and 14 are respective conceptual diagrams illustrating possible operations associated with a defined condition according to method step S420 of FIG. 12.

Referring to FIG. 13A, when a processing operation using a second offloading program is completed, the value of a count of the count table 323_1 having the index '#2' corresponding to the second offloading program may be decreased from '1' to '0', and a state in which the second offloading program is stored in the count table 323_1 may be maintained. Further, a timer corresponding to the count having the index '#2' may be started from a first time point t11 at which the value of the count having the index '#2' is changed. When the storage device has not newly received the second offloading program by a third time point t31, the timer may expire, and, at the third time point t31 at which the timer expires, the second offloading program may be deleted from the offloading program table 323_4.

Referring to FIG. 13B and in contrast to the embodiment of FIG. 13A, the second offloading program may be newly received at a second time point t21 between the first time point t11 and the third time point t31 while the timer is running. Here, the timer may be reset at the second time point t21, the value of the count of the count table 323_1 having the index '#2' corresponding to the second offloading program may be changed from '0' to '1', and storage of the newly received second offloading program in the offloading program table 323_4 may be omitted.

FIG. 14 is a diagram for describing operations according to a condition according to another embodiment in operation S420 of FIG. 12.

Referring to FIG. 14, when a processing operation using a second offloading program is completed, the value of a count of the count table 323_1 having the index '#2' corresponding to the second offloading program may be decreased from '1' to '0', and a state in which the second offloading program is stored in the count table 323_1 may be maintained. In FIG. 14, an additional table 323_6 indicating maximum values of the counts of the count table 323_1 may be further used. In detail, through the additional table 323_6, it may be indicated that the maximum value of a count having the index '#1' is '4', the maximum value of a count having the index '#2' is '3', and the maximum value of a count having the index '#3' is '2'.

Thereafter, after processing operations using first and third offloading programs different from the second offloading program are performed a total of '3' times in correspondence to the maximum value of the count having the index '#2', the second offloading program may be deleted from the offloading program table 323_4.

Alternately, an additional table indicating average count values or values associated with count patterns may be referenced in other embodiments of the inventive concept.

Figure 15:
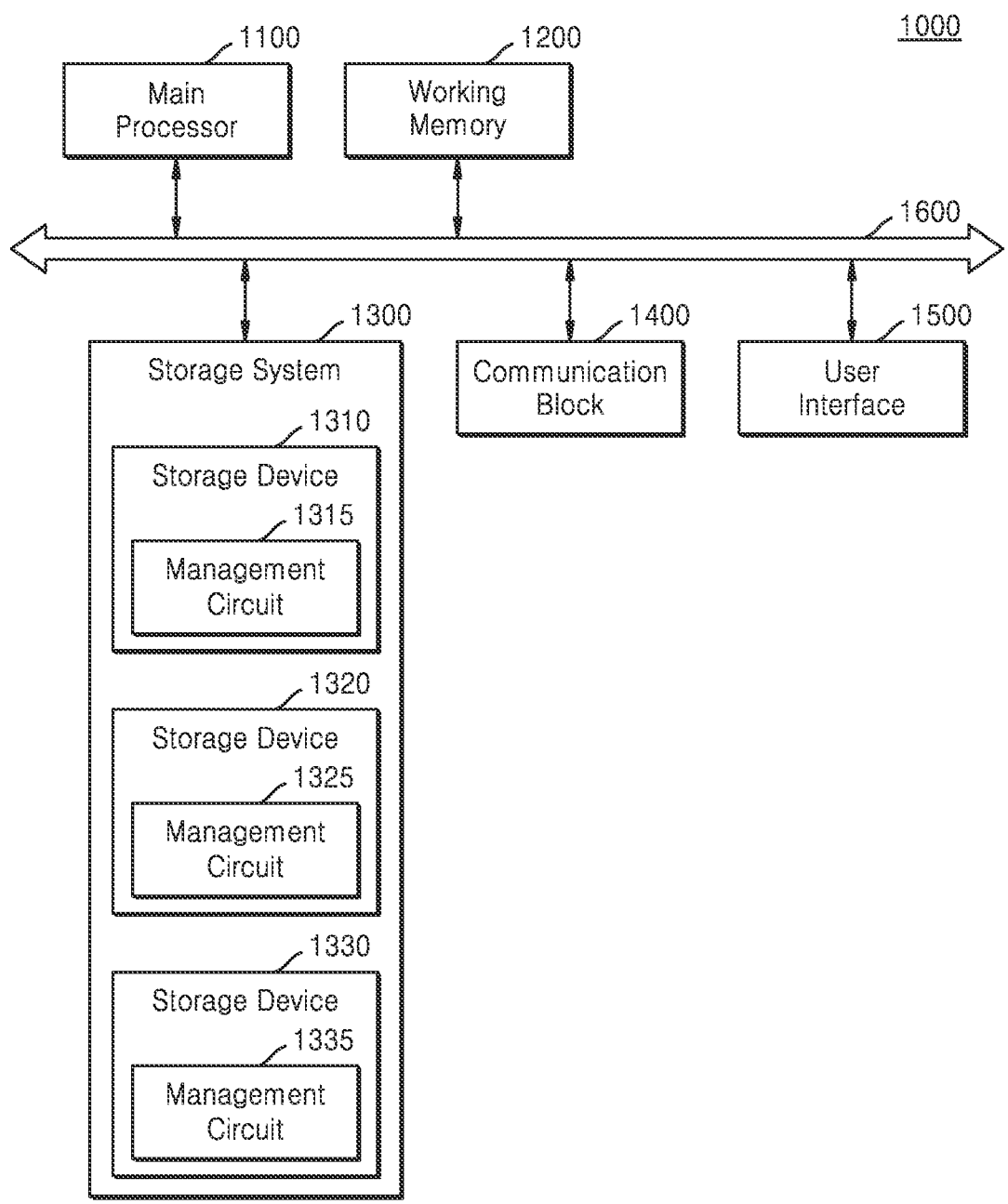
FIG. 15 is a block diagram illustrating an electronic system according to embodiments of the inventive concept.

FIG. 15 is a block diagram illustrating an electronic system 1000 according to embodiments of the inventive concept.

Referring to FIG. 15, the electronic system 1000 may include a main processor 1100, a working memory 1200, a storage system 1300, a communication block 1400, a user interface 1500, and a bus 1600. For example, the electronic system 1000 may be one of electronic devices including a desktop computer, a laptop computer, a tablet computer, a smartphone, a wearable device, a video game console, a workstation, one or more servers, an electric vehicle, a home appliance, a medical device. etc.

The main processor 1100 may control all operations of the electronic system 1000. For example, the main processor 1100 may be implemented by a general-purpose processor including one or more processor cores, a dedicated processor, or an application processor.

The working memory 1200 may store data used for an operation of the electronic system 1000. For example, the working memory 1200 may temporarily store data processed or to be processed by the main processor 1100. For example, the working memory 1200 may include a volatile memory, such as SRAM, DRAM, SDRAM, etc. and/or a non-volatile memory, such as PRAM, MRAM, ReRAM, FRAM, etc.

The storage system 1300 may include one or more storage devices. For example, the storage system 1300 may include storage devices 1310, 1320, and 1330. Although FIG. 15 shows three storage devices 1310, 1320, and 1330, various changes or modifications may be made in the number of storage devices included in the storage system 1300 to suit the requirements of the electronic system 1000.

The storage devices 1310, 1320, and 1330 may each store data regardless of power supply. For example, the storage devices 1310, 1320, and 1330 may each include a non-volatile memory, such as flash memory, PRAM, MRAM, ReRAM, FRAM, etc. For example, the storage devices 1310, 1320, and 1330 may each include a storage medium, such as an SSD, a card storage, an embedded storage, etc.

The storage devices 1310, 1320, and 1330 may include management circuits 1315, 1325, and 1335 according to the embodiments described above with reference to FIGS. 1 to 14, respectively. The management circuits 1315, 1325, and 1335 may manage a plurality of offloading programs received from the main processor 1100 using a count table, such that the offloading programs are not redundantly stored in an offloading program table.

The communication block 1400 may support at least one of various wireless/wired communication protocols to communicate with a device and/or a system outside the electronic system 1000. The user interface 1500 may include various input/output interfaces to interface communication between a user and the electronic system 1000.

The bus 1600 may provide communication paths between components of the electronic system 1000. The components of the electronic system 1000 may exchange data according to a bus format of the bus 1600. For example, the bus format may include one or more from among various interface protocols such as, Universal Serial Bus (USB), Small Computer System Interface (SCSI), Peripheral Component Interconnect Express (PCIe), Serial Advanced Technology Attachment (SATA), Serial Attached SCSI (SAS), Non-volatile Memory Express (NVMe), Universal Flash Storage (UFS), Double Data Rate (DDR), Low Power DDR (LPDDR), etc.

The main processor 1100 may operate as a host device. The main processor 1100 may provide a service to a user by communicating with each of the storage devices 1310, 1320, and 1330. For example, the main processor 1100 may write data to the storage devices 1310, 1320, and 1330 and read data from the storage devices 1310, 1320, and 1330.

Figure 16:
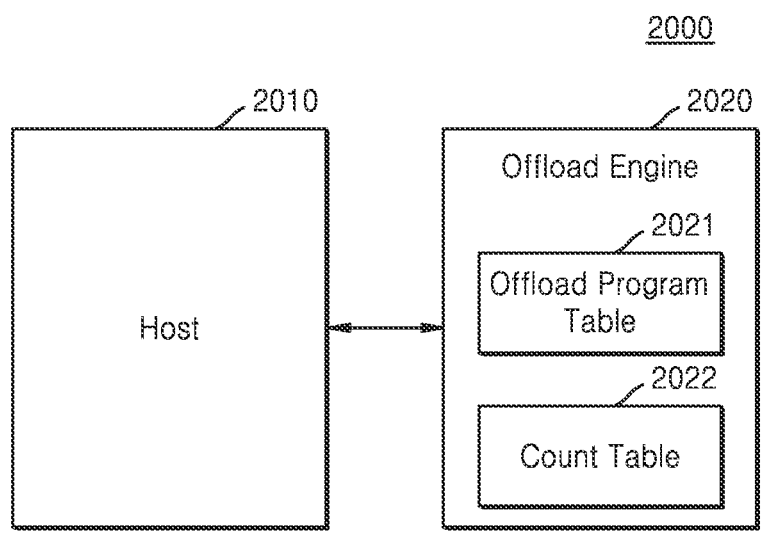
FIG. 16 is a block diagram illustrating a database system according to embodiments of the inventive concept.

FIG. 16 is a block diagram illustrating a database system 2000 according to embodiments of the inventive concept.

Referring to FIG. 16, the database system 2000 may include a host 2010 and an offloading engine 2020. In some embodiments, the offloading engine 2020 may be a part of the host 2010 or connected to the host 2010. The host 2010 may be a computer or a server including a CPU, a main memory, and a permanent storage (e.g., a hard disk drive or an SSD). The offloading engine 2020 may include a permanent memory or be connected to a permanent memory. A permanent memory may be a type of memory that maintains the balance among speed, capacity, and persistence. The offloading engine 2020 may include a processing circuit and a memory. The offloading engine 2020 may be connected to the host 2010 via one of various interfaces including a NVDIMM-p and a PCIe (via memory channels).

The host 2010 may perform various database processing operations including queries to be executed. The offloading engine 2020 may reduce the load of the host 2010 by performing database processing operations in place of the host 2010.

The offloading engine 2020 may manage a plurality of offloading programs received from the host 2010 using an offloading program table 2021 and a count table 2022 according to the embodiments described above with reference to FIGS. 1 to 14. In some embodiments, the offloading engine 2020 may be designed as special hardware that requires less energy for performing processing operations in place of the host 2010 than general-purpose hardware of the CPU of the host 2010.

While the inventive concept has been particularly shown and described with reference to embodiments thereof, it will be understood that various changes in form and details may be made therein without departing from the scope of the inventive concept as defined by the following claims.

What is claimed is:

1. A method of operating a storage device, the method comprising:
receiving an offloading program and an offloading request;
increasing a first count value associated with a first offloading program in a count table based on receiving the offloading program that is identical to the first offloading program stored in a offloading program table, wherein the count table is configured to store the first count value indicating a remaining number of first processing operations to be performed for the first offloading program;
performing the first processing operations comprises reading the first offloading program from the offloading program table, checking the first count value in the count table, executing the first processing operations using the first offloading program, and decreasing the first count value based on the first processing operations being performed;
obtaining a comparison result based upon comparing the first count value with a reference count value; and
allocating, based on the comparison result, a memory region size among a plurality of different memory region sizes in a memory device for the executing the first processing operations using the first offloading program.

2. A storage device comprising:
a memory device;
a management circuit configured to manage an offloading program table storing a plurality of different offloading programs and a count table, wherein the count table is configured to store count values indicating a remaining number of processing operations to be performed for each of the plurality of different offloading programs, the plurality of different offloading programs including a first offloading program; and
a computing circuit configured to perform a first processing operation comprising
reading, from the offloading program table, the first offloading program,
checking a first count value among the count values corresponding to the first offloading program in the count table,
executing the first processing operation using the first offloading program a number of times that matches the first count value,
providing a signal indicating completion of the first processing operation to the management circuit, and
storing processing data corresponding to the first processing operation in the memory device,
wherein the management circuit is configured to,
increase the first count value based on receiving an offloading program that is identical to the first offloading program, and
decrease the first count value based on the first processing operation being performed by the computing circuit, and
wherein the management circuit is configured to
obtain a comparison result based on comparing the first count value with a reference count value, and
allocate, based on the comparison result, a memory region size among a plurality of different memory region sizes in the memory device for the executing the first processing operation using the first offloading program.

3. The storage device of claim 2, wherein the management circuit is further configured to check that the offloading program is identical to the first offloading program by comparing the first offloading program with the offloading program on a bit-by-bit basis.

4. The storage device of claim 2, wherein the management circuit is further configured to generate a key by applying a hash function to the first offloading program and check whether the first offloading program is stored in a slot of the offloading program table corresponding to the generated key.

5. The storage device of claim 2, wherein the management circuit is further configured to, upon determining that the first offloading program is not identical to the offloading program, store the offloading program in the offloading program table and increase a count value corresponding to the offloading program.

6. The storage device of claim 2, wherein the management circuit is further configured to delete the first offloading program from the offloading program table when the first count value is decreased to an initial value.

7. The storage device of claim 2,
wherein the offloading program table additionally stores a second offloading program and the count table additionally stores a second count value indicating the remaining number of processing operations using the second offloading program,
wherein the computing circuit is further configured to perform a number of processing operations corresponding to the second count value using the second offloading program, and
wherein the management circuit is further configured to, upon completion of the number of the processing operations, delete the second offloading program from the offloading program table in accordance with a pattern of the second count value.

8. The storage device of claim 7, wherein the pattern is determined in response to at least one of a change interval of the second count value, a maximum value of the second count value, an average value of the second count value, and a determination of whether the second offloading program is a hot offloading program or a cold offloading program.

9. The storage device of claim 8, wherein the management circuit is further configured to determine the pattern by tracking changes in the second count value during a defined period.

10. The storage device of claim 7, wherein the management circuit is further configured to, upon determining that a condition associated with the pattern is not satisfied in relation to a time period beginning when the second count value changes to an initial value, delete the second offloading program from the offloading program table.

11. The storage device of claim 10, wherein the condition is indicated by a timer expiring while the second count value is maintained at an initial count value during the time period.

12. The storage device of claim 10,
wherein the offloading program table additionally stores a third offloading program different from the second offloading program, and
wherein the condition relates to performing a number of processing operations using the third offloading program in response to the second count value.

13. The storage device of claim 2,
wherein the first offloading program is associated with a first offloading program identification (ID), and
wherein the management circuit is further configured to check integrity of the first offloading program by comparing the first offloading program ID with offloading program ID associated with the offloading program.

14. The storage device of claim 13,
wherein the offloading program is identical to the first offloading program, and
wherein the management circuit is further configured to determine an integrity error related to the first offloading program upon determining that the first offloading program ID is different from the offloading program ID.

15. The storage device of claim 13,
wherein the offloading program is different from the first offloading program, and
wherein the management circuit is further configured to determine an integrity error related to the first offloading program when the first offloading program ID is identical to the offloading program ID.

16. A storage device comprising:
a memory device; and
a controller configured to increase a first count value associated with a first offloading program in a count table based on receiving an offloading program that is identical to the first offloading program stored in an offloading program table, wherein the count table is configured to store the first count value indicating a remaining number of first processing operations to be performed for the first offloading program,
wherein the first processing operations are executed under the control of the controller in accordance with the offloading program table and the count table, and
wherein the first processing operations comprise
reading the first offloading program from the offloading program table,
checking the first count value in the count table,
executing the first processing operations using the first offloading program, and decreasing the first count value based on the first processing operations being performed,
providing a signal indicating completion of the first processing operations, and storing data corresponding to the first processing operations in the memory device,
wherein the controller is configured to
obtain a comparison result based on comparing the first count value with a reference count value, and
allocate, based on the comparison result, a memory region size among a plurality of different memory region sizes in the memory device for the executing the first processing operation using the first offloading program.

17. The storage device of claim 16, wherein the controller is configured to control memory operations accessing the memory device and perform a memory allocation operation in relation to the memory device in response to the count table.

* * * * *